US012592353B2

(12) United States Patent
Dai et al.

(10) Patent No.: US 12,592,353 B2
(45) Date of Patent: Mar. 31, 2026

(54) RELAY

(71) Applicant: Xiamen Hongfa Electric Power Controls Co., Ltd., Xiamen (CN)

(72) Inventors: Wenguang Dai, Xiamen (CN); Songsheng Chen, Xiamen (CN); Meng Wang, Xiamen (CN); Dapeng Fu, Xiamen (CN); Fengzhu Xie, Xiamen (CN)

(73) Assignee: XIAMEN HONGFA ELECTRIC POWER CONTROLS CO., LTD., Xiamen (CN)

( * ) Notice: Subject to any disclaimer, the term of this patent is extended or adjusted under 35 U.S.C. 154(b) by 142 days.

(21) Appl. No.: 18/485,736

(22) Filed: Oct. 12, 2023

(65) Prior Publication Data

US 2024/0128038 A1 Apr. 18, 2024

(30) Foreign Application Priority Data

Oct. 12, 2022 (CN) ......................... 202211249156.4
Oct. 12, 2022 (CN) ......................... 202211249321.6

(51) Int. Cl.
*H01H 50/42* (2006.01)
*H01H 50/54* (2006.01)

(52) U.S. Cl.
CPC ............ *H01H 50/42* (2013.01); *H01H 50/54* (2013.01)

(58) Field of Classification Search
CPC .......... H01H 50/42; H01H 50/54; H01H 1/54; H01H 50/60; H01H 50/045; H01H 50/546; H01H 50/02; H01H 50/10; H01H 50/16

(Continued)

(56) References Cited

U.S. PATENT DOCUMENTS 4,933,654 A 6/1990 Hori et al.
9,070,525 B2 6/2015 Hirabayashi
(Continued)

FOREIGN PATENT DOCUMENTS

CN 103238198 A 8/2013
CN 103069531 B 5/2015
(Continued)

OTHER PUBLICATIONS

International Search Report; PCT/CN2023/123423; ISA/CN; Mailed Dec. 29, 2023; 4 pages; No English translation available.
(Continued)

*Primary Examiner* — Shawki S Ismail
*Assistant Examiner* — Lisa N Homza
(74) *Attorney, Agent, or Firm* — CANTOR COLBURN LLP

(57) ABSTRACT

A relay includes a contact container having a contact chamber, a pair of first through holes and a second through hole communicated with the contact chamber; a pair of static contact leading-out terminals passed through the first through holes and connected to the contact container; a connector passing through the second through hole and connected to the contact container; a first magnetizer provided in the contact chamber and connected to the connector; and a pushing rod assembly including a movable component with a movable contact piece. The movable component is movably provided in the contact chamber to make the movable contact piece come into contact with or separate from the pair of static contact leading-out terminals. The first magnetizer is arranged at a side of the movable contact piece facing the static contact leading-out terminals.

15 Claims, 16 Drawing Sheets

(58) Field of Classification Search
USPC .............................................................. 335/16
See application file for complete search history.

(56) References Cited

U.S. PATENT DOCUMENTS

| | | | | |
|---|---|---|---|---|
| 2019/0035585 | A1 | 1/2019 | Minowa et al. | |
| 2020/0098531 | A1* | 3/2020 | Zhang | H01H 73/18 |
| 2022/0013316 | A1* | 1/2022 | Zhong | H01H 50/64 |
| 2022/0122792 | A1 | 4/2022 | Zhou | |
| 2024/0145188 | A1* | 5/2024 | Dai | H01H 9/443 |
| 2024/0177956 | A1* | 5/2024 | Zhong | H01H 9/30 |
| 2024/0312744 | A1* | 9/2024 | Dai | H01H 50/54 |
| 2024/0312746 | A1* | 9/2024 | Dai | H01H 50/546 |
| 2024/0347297 | A1* | 10/2024 | Dai | H01H 50/24 |
| 2024/0347298 | A1* | 10/2024 | Dai | H01H 50/021 |
| 2024/0347299 | A1* | 10/2024 | Zhong | H01H 50/18 |
| 2024/0347300 | A1* | 10/2024 | Dai | H01H 50/14 |
| 2024/0347301 | A1* | 10/2024 | Dai | H01H 50/546 |
| 2024/0347302 | A1* | 10/2024 | Wang | H01H 50/546 |
| 2024/0347303 | A1* | 10/2024 | Dai | H01H 1/54 |
| 2025/0095940 | A1* | 3/2025 | Dai | H01H 1/54 |

FOREIGN PATENT DOCUMENTS

| | | | |
|---|---|---|---|
| CN | 104810205 | A | 7/2015 |
| CN | 103038851 | B | 8/2015 |
| CN | 104241028 | B | 4/2016 |
| CN | 106486324 | A | 3/2017 |
| CN | 206451665 | U | 8/2017 |
| CN | 206819939 | U | 12/2017 |
| CN | 109559939 | A | 4/2019 |
| CN | 109659199 | A | 4/2019 |
| CN | 110164737 | A | 8/2019 |
| CN | 110349811 | A | 10/2019 |
| CN | 210142625 | U | 3/2020 |
| CN | 111091987 | A | 5/2020 |
| CN | 111092002 | A | 5/2020 |
| CN | 211320483 | U | 8/2020 |
| CN | 111627758 | A | 9/2020 |
| CN | 211575481 | U | 9/2020 |
| CN | 211980527 | U | 11/2020 |
| CN | 212032904 | U | 11/2020 |
| CN | 212032959 | U | 11/2020 |
| CN | 212084924 | U | 12/2020 |
| CN | 212182232 | U | 12/2020 |
| CN | 212461544 | U | 2/2021 |
| CN | 112447450 | A | 3/2021 |
| CN | 112542355 | A | 3/2021 |
| CN | 212786153 | U | 3/2021 |
| CN | 112750663 | A | 5/2021 |
| CN | 112967906 | A | 6/2021 |
| CN | 213459580 | U | 6/2021 |
| CN | 213936054 | U | 8/2021 |
| CN | 214542039 | U | 10/2021 |
| CN | 113782392 | A | 12/2021 |
| CN | 215451293 | U | 1/2022 |
| CN | 216122877 | U | 3/2022 |
| CN | 216528650 | U | 5/2022 |
| CN | 217158052 | U | 8/2022 |
| CN | 218385011 | U | 1/2023 |
| CN | 218385017 | U | 1/2023 |
| CN | 218385018 | U | 1/2023 |
| CN | 218385019 | U | 1/2023 |
| CN | 218385036 | U | 1/2023 |
| CN | 218385037 | U | 1/2023 |
| CN | 218385041 | U | 1/2023 |
| CN | 218385042 | | 1/2023 |
| CN | 218385043 | | 1/2023 |
| CN | 218631843 | | 3/2023 |
| CN | 218730704 | | 3/2023 |
| CN | 218996617 | | 5/2023 |
| EP | 4012741 | A1 | 6/2022 |
| JP | S53112736 | U | 9/1978 |
| JP | 2012022982 | A | 2/2012 |
| JP | 2012104362 | A | 5/2012 |
| JP | 2012199122 | A | 10/2012 |
| JP | 2013243110 | A | 12/2013 |
| JP | 5559662 | B2 | 7/2014 |
| JP | 2014157830 | A | 8/2014 |
| JP | 2015079672 | A | 4/2015 |
| JP | 5821008 | B2 | 11/2015 |
| JP | 5821009 | B2 | 11/2015 |
| JP | 2019192545 | A | 10/2019 |
| JP | 2022503584 | A | 1/2022 |
| JP | 2022139817 | A | 9/2022 |
| WO | 2021136401 | A1 | 7/2021 |
| WO | 2021238388 | A1 | 12/2021 |

OTHER PUBLICATIONS

International Search Report; PCT/CN2023/123428; ISA/CN; Mailed Dec. 29, 2023; 3 pages; No English translation available.
International Search Report; PCT/CN2023/123432; ISA/CN; Mailed Dec. 29, 2023; 3 pages; No English translation available.
International Search Report; PCT/CN2023/123595; ISA/CN; Mailed Dec. 29, 2023; 4 pages; No English translation available.
International Search Report; PCT/CN2023/123604; ISA/CN; Mailed Dec. 29, 2023; 4 pages; No English translation available.
International Search Report; PCT/CN2023/124040; ISA/CN; Mailed Dec. 29, 2023; 4 pages; No English translation available.
International Search Report; PCT/CN2023/124044; ISA/CN; Mailed Dec. 11, 2023; 3 pages; No English translation available.
Blank Form PCT/ISA/201 (second sheet); provided as English translation for relevancy of Chinese ISR documents.
International Search Report; PCT/CN2023/123399; ISA/CN; Mailed Feb. 1, 2024; 3 pages; No English translation available.
International Search Report; PCT/CN2023/124058; ISA/CN; Mailed Dec. 21, 2023; 4 pages; No English translation available.
International Search Report; PCT/CN2023/124059; ISA/CN; Mailed Jan. 3, 2024; 5 pages; No English translation available.
Extended European Search Report for Application No. 23203222.7; Mailed Mar. 6, 2024; 9 pages.
JP2023-176137-Notice of Allowance with English; dated: Mar. 24, 2025; 5 pages.
First Office Action; Chinese Patent Application No. 202211249316.5; Chinese Center for Patent Examination; posted Aug. 27, 2025; 57 pages with English Translation.
China National Intellectual Property Administration Rejection Decision; Issued Jan. 29, 2026; 40 pages.
Extended European Search Report for Application No. 23876663.8; Mailed Jan. 7, 2026; 9 pages.
Extended European Search Report for Application No. 23876743.8 Mailed Jan. 7, 2026; 8 pages.
Extended European Search Report for Application No. 23876744.6 Mailed Dec. 12, 2025, 9 pages.
Fundamentals of Machinery; 2009Planned Textbookfor Secondary Vocational EducationISBN 978-7-5020-3555-6 I. M . . . II. H . . . III. Mechanics—Textbooks for vocational schools IV. TH11CIP Data No. (2009) 112640 by China NationalLibrary of Chinese Books; 24 pages.
Japan Patent Office First Office Action for JP Patent Application No. 2025-521001; Mailed Jan. 27, 2026; 10 pages.

* cited by examiner

RELAY

CROSS REFERENCE

This application is based upon and claims priority to Chinese Patent Application No. 202211249156.4; and Chinese Patent Application No. 202211249321.6, both filed on Oct. 12, 2022; the entire contents thereof are incorporated herein by reference.

TECHNICAL FIELD

This disclosure relates to the technical field of relays, in particular to a high-voltage DC relay.

BACKGROUND

A relay is an electronic control device that has a control system (also called an input loop) and a controlled system (also called an output loop), and usually used in an automatic control unit. The relay is actually an automatic switch that may control a larger current with a smaller current, so that it plays a role of automatic adjustment, safety protection and switching circuits in the circuit.

A high-voltage DC relay is a kind of relay. When the short-circuit load is large, the contacts of the high-voltage DC relay will bounce off due to the electrodynamic repulsion force, and the instantaneous bounce of the contacts will cause the relay to burn and explode under the action of strong arc.

In the related art, the relay usually has an anti-short circuit current structure to prevent the contacts from bouncing off. Specifically, a magnetizer is arranged in the contact container of the relay. When the electrodynamic restoration force is generated by short-circuit current, the magnetizer will be magnetized to generate electromagnetic attraction, thus preventing the movable contact piece from instantly bouncing off and preventing the relay from burning and exploding.

However, in the related art, the connection structure between the magnetizer and the contact container of the relay is designed unreasonably, which leads to the problems that the connection between the magnetizer and the contact container is not firm and the assembly is not convenient.

SUMMARY

According to one aspect of the present disclosure, a relay includes a contact container having a contact chamber, a pair of first through holes and a second through hole, both the first through holes and the second through hole being communicate with the contact chamber; a pair of static contact leading-out terminals passing through the pair of the first through holes in one-to-one correspondence and being connected to the contact container; a connector passing through the second through hole and including a first end and a second end, the first end being connected to the contact container; a first magnetizer provided in the contact chamber and connected to the second end of the connector; and a pushing rod assembly including a movable component with a movable contact piece, the movable component being movably provided in the contact chamber to make the movable contact piece come into contact with or separate from the pair of static contact leading-out terminals, the first magnetizer being arranged at a side of the movable contact piece facing the static contact leading-out terminals.

According to some embodiments of the present disclosure, the second through hole is located between the pair of first through holes.

According to some embodiments of the present disclosure, the contact container includes: a yoke plate having a third through hole communicating with the contact chamber, the pushing rod assembly movable passing through the third through hole; and an insulating cover connected to the yoke plate;

wherein both the first through holes and the second through hole are formed in the insulating cover, the first end of the connector is connected to an outer surface of the insulating cover.

According to some embodiments of the present disclosure, the insulating cover includes a top wall and a side wall, one end of the side wall is connected to the top wall, and the other end of the side wall is connected to the yoke plate, both the first through holes and the second through hole are formed in the top wall.

According to some embodiments of the present disclosure, the insulating cover includes a ceramic cover and a frame piece, the ceramic cover includes a top wall and a side wall, the side wall is connected to the yoke plate by the frame piece;

the outer surface of the top wall at the periphery of the first through holes is provided with a first metallization layer, and the outer surface of the top wall at the periphery of the second through hole is provided with a second metallization layer;

the static contact leading-out terminals are welded to the top wall through the first metallization layer, the first end of the connector is welded to the top wall through the second metallization layer.

According to some embodiments of the present disclosure, the top wall and the side wall are integrated; or, the top wall and the side wall are separated.

According to some embodiments of the present disclosure, the first magnetizer is spaced from the inner surface of the top wall.

According to some embodiments of the present disclosure, the second end of the connector and the first magnetizer are riveted or welded or glued together.

According to some embodiments of the present disclosure, the first magnetizer includes a plurality of magnetic conductive sheets superposed with each other, the magnetic conductive sheets are connected with the second end of the connector.

According to some embodiments of the present disclosure, the pushing rod assembly further including:

a base;

an elastic piece, the elastic piece abuts on the base at one end and the movable component at the other end, the elastic piece provides elastic force to make the movable contact piece tend to move towards the static contact leading-out terminals; a limit structure connected to the base and the movable component and used to limit a movement range of the movable component relative to the base; wherein the limit structure includes a limit hole and a limit member cooperated with each other. The limit hole includes a first end and a second end along an opposite direction of the movement of the movable contact piece. The limit member passes through the limit hole and can move between the first end and the second end. When the movable contact piece is separated from the static contact leading-out terminals, the limit member is located at the first end of the limit hole.

According to some embodiments of the present disclosure, wherein an aperture of the second end is greater than an aperture of the first end.

According to some embodiments of the present disclosure, wherein the limit member has first arc surfaces, and the first arc surfaces are used to cooperate with the limit hole to realize limitation along a length direction of the movable contact piece when the limit member is located at the first end of the limit hole.

According to some embodiments of the present disclosure, the movable component further includes a fixing piece fixedly connected to the movable contact piece. The limit member is provided on one of the fixing piece and the base, and the limit hole is formed in the other one of the fixing piece and the base.

DETAILED DESCRIPTION

Now, the exemplary implementations will be described more completely with reference to the accompanying drawings. However, the exemplary implementations can be implemented in various forms and should not be construed as limiting the implementations as set forth herein. Instead, these implementations are provided so that the present disclosure will be thorough and complete, and concept of the exemplary implementation will be fully conveyed to a skilled person in the art. Same reference numbers denote the same or similar structures in the figures, and thus the detailed description thereof will be omitted.

Figure 14:
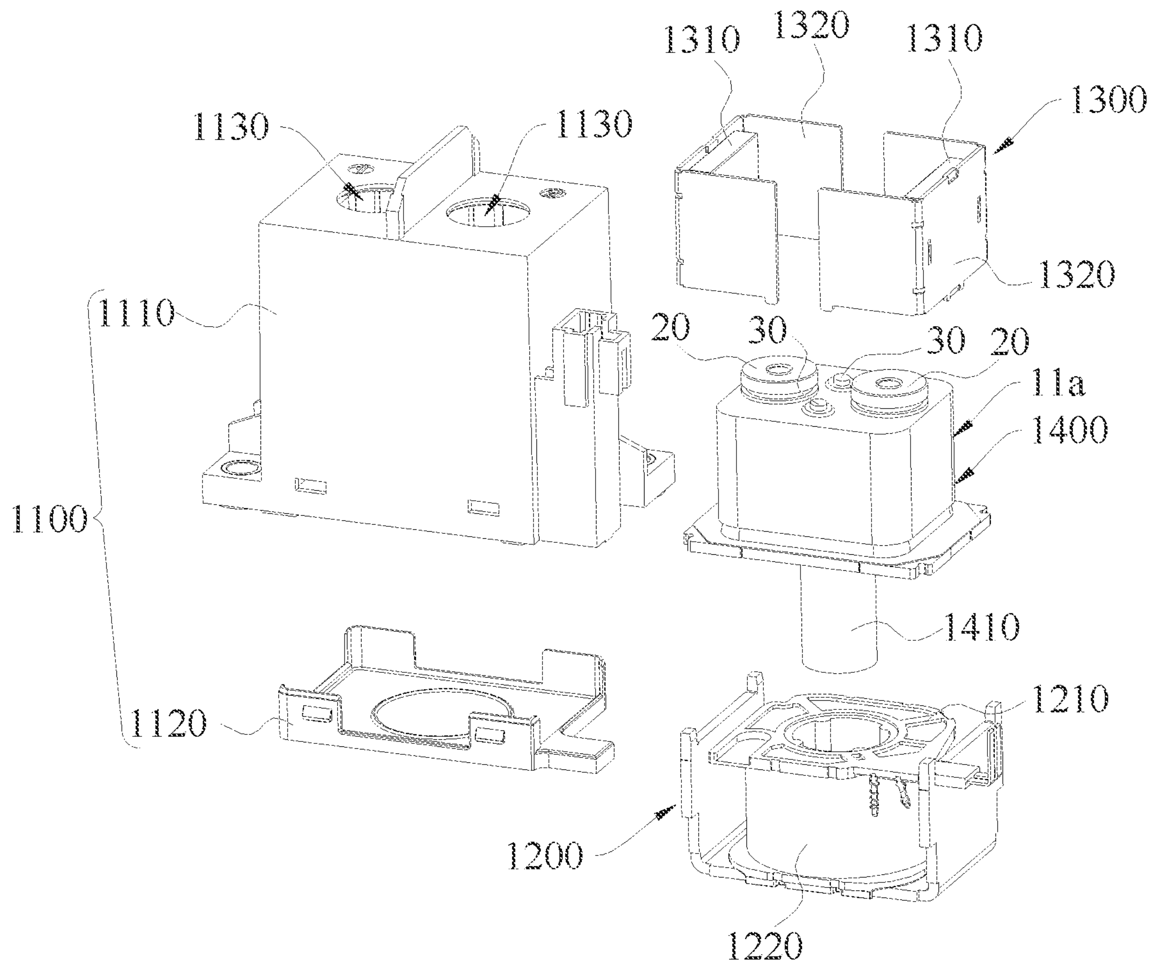
FIG. 14 is an exploded view of the relay according to the first embodiment of the present disclosure.
Figure 15:
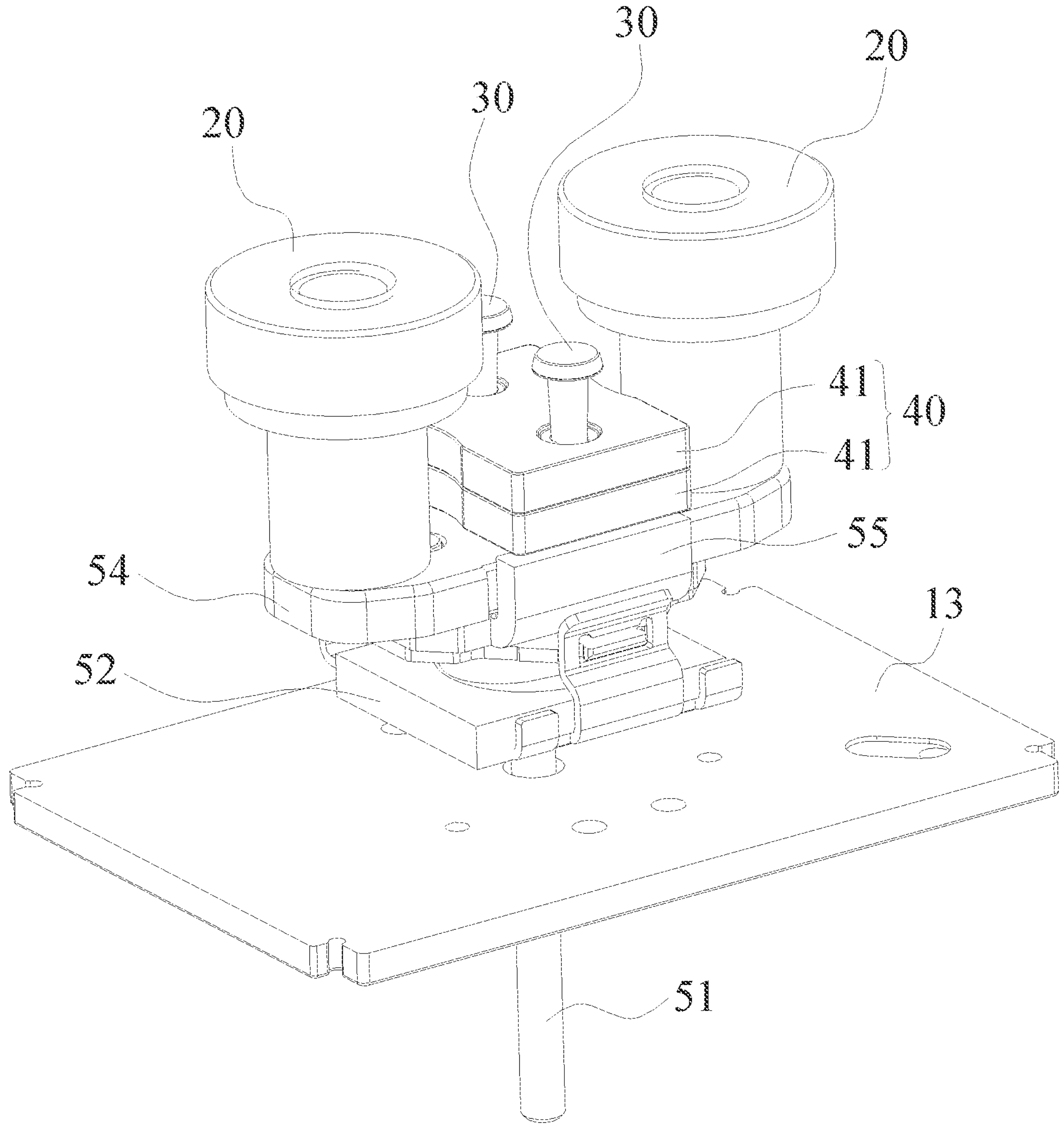
FIG. 15 is a perspective view of FIG. 1, in which the insulating cover is omitted.
Figure 16:
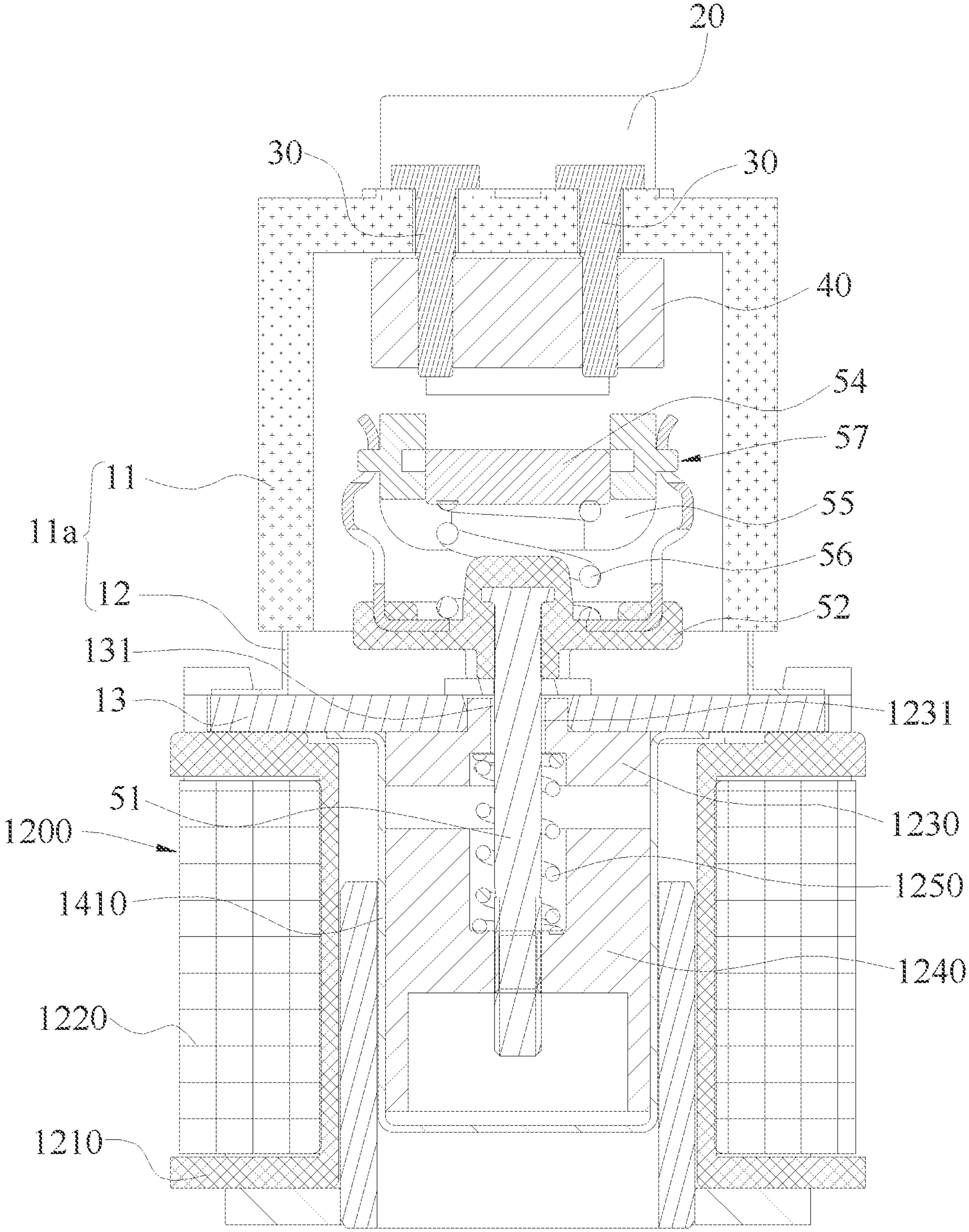
FIG. 16 is a cross-sectional view taken along line C-C in FIG. 2.

As shown in FIGS. 14 to 16, FIG. 14 is an exploded view of the relay according to the first embodiment of the present disclosure. The relay includes a shell 1100, an electromagnet unit 1200, an arc extinguishing unit 1300 and a sealing unit 1400. The sealing unit 1400 is disposed inside the shell 1100. The top of the static contact leading-out terminals 20 of the sealing unit 1400 is exposed on the outer surface of the shell 1100 through the exposure hole 1130 of the shell 1100. Both the electromagnet unit 1200 and the arc extinguishing unit 1300 are arranged inside the shell 1100.

As an example, the shell 1100 includes a first shell 1110 and a second shell 1120, and the first shell 1110 and the second shell 1120 are clamped to form a chamber for accommodating the electromagnet unit 1200, the arc stretching unit 1300 and the sealing unit 1400.

The arc extinguishing unit 1300 is used to extinguish the arc generated between the static contact leading-out terminals 20 and the movable contact piece of the sealing unit 1400.

As an example, the arc extinguishing unit 1300 includes two arc extinguishing magnets 1310. The arc extinguishing magnets 1310 may be a permanent magnet, each of the arc extinguishing magnets 1310 may be generally rectangular. Two arc extinguishing magnets 1310 are respectively arranged on both sides of the insulating cover and are oppositely arranged along the length direction D2 of the movable contact piece.

A magnetic field can be formed around the static contact leading-out terminals and the movable contact piece by providing two arc stretching magnets 1310 opposite to each other. Therefore, the arc generated between the static contact leading-out terminals and the movable contact piece will be elongated in the direction away from each other under the action of the magnetic field, thus realizing arc extinguishing.

The arc extinguishing unit 1300 further includes two yoke clamps 1320. The positions of two yoke clamps 1320 and two arc extinguishing magnets 1310 correspond, and two yoke clamps 1320 surrounds the sealing unit 1400 and two arc extinguishing magnets 1310. Through the design that yoke clamps 1320 surrounds the extinguishing magnet 1310, the magnetic field generated by the arc extinguishing magnet 1310 can be prevented from spreading outward, which will affect the arc extinguishing effect. The yoke clamps 1320 may be made of soft magnetic material. Soft magnetic materials can include but are not limited to iron, cobalt, nickel and their alloys.

Figure 1:
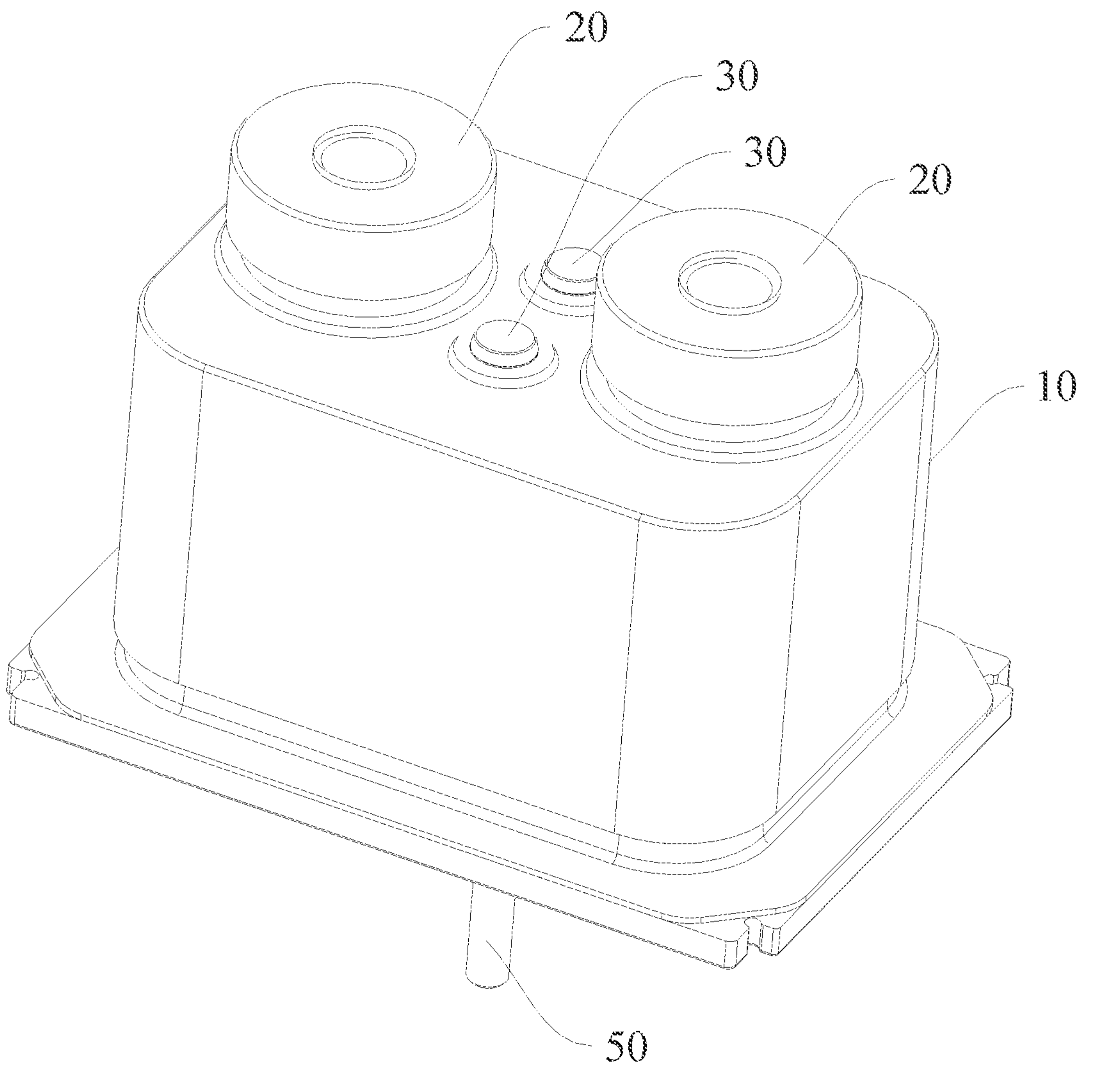
FIG. 1 is a schematic perspective view of the relay according to the first embodiment of the present disclosure, in which the coil and the magnetic circuit structure are omitted.
Figure 2:
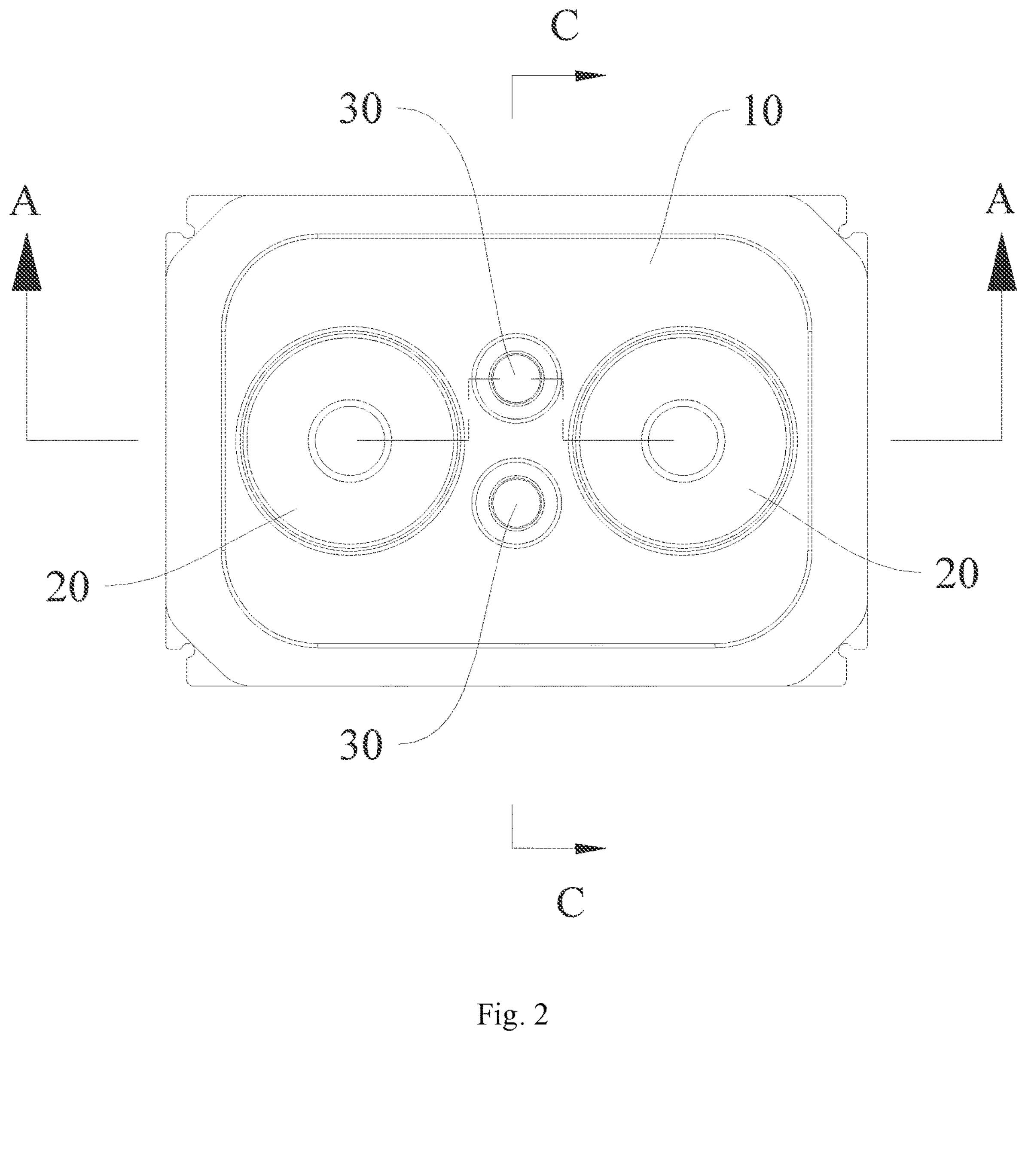
FIG. 2 shows a schematic plan view of FIG. 1.
Figure 3:
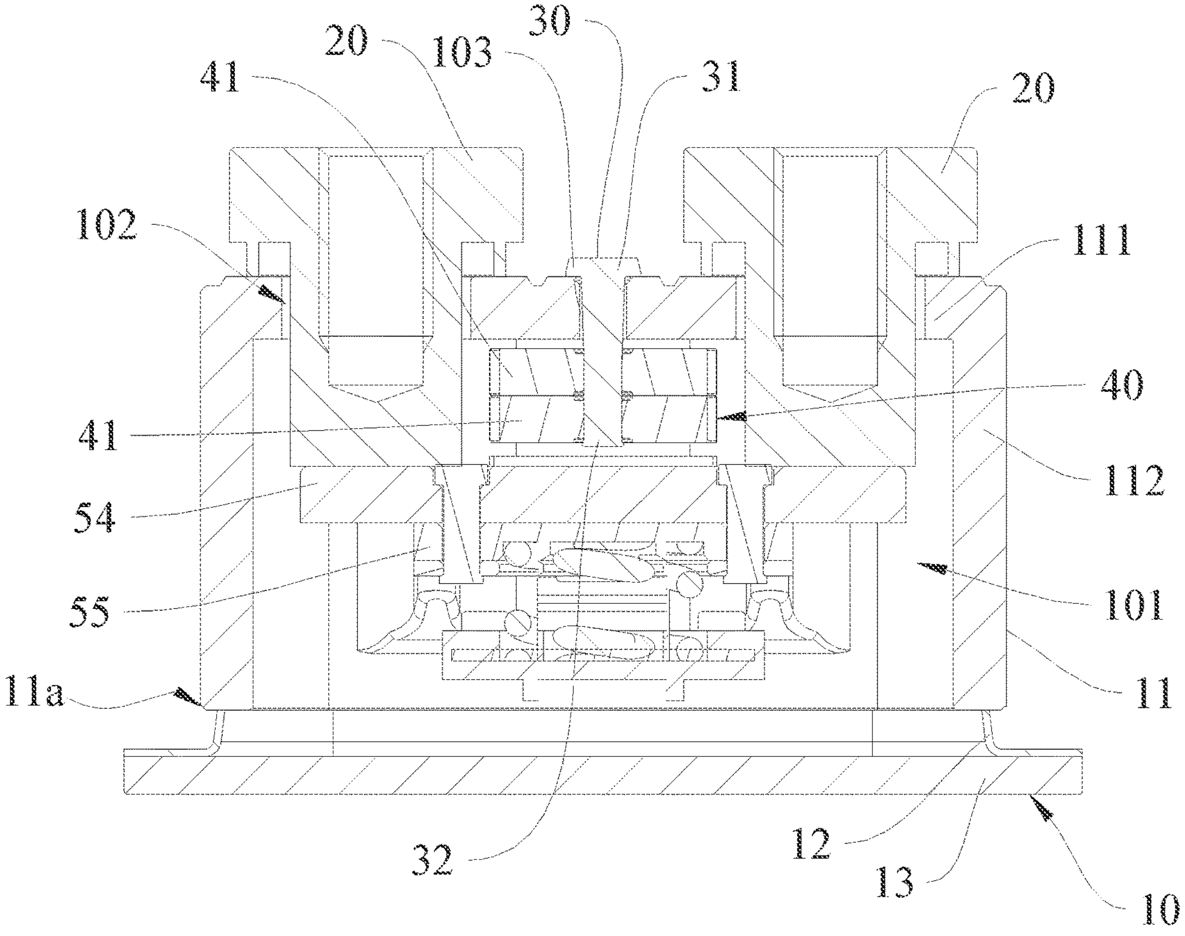
FIG. 3 shows a cross-sectional view of A-A in FIG. 2.
Figure 4:
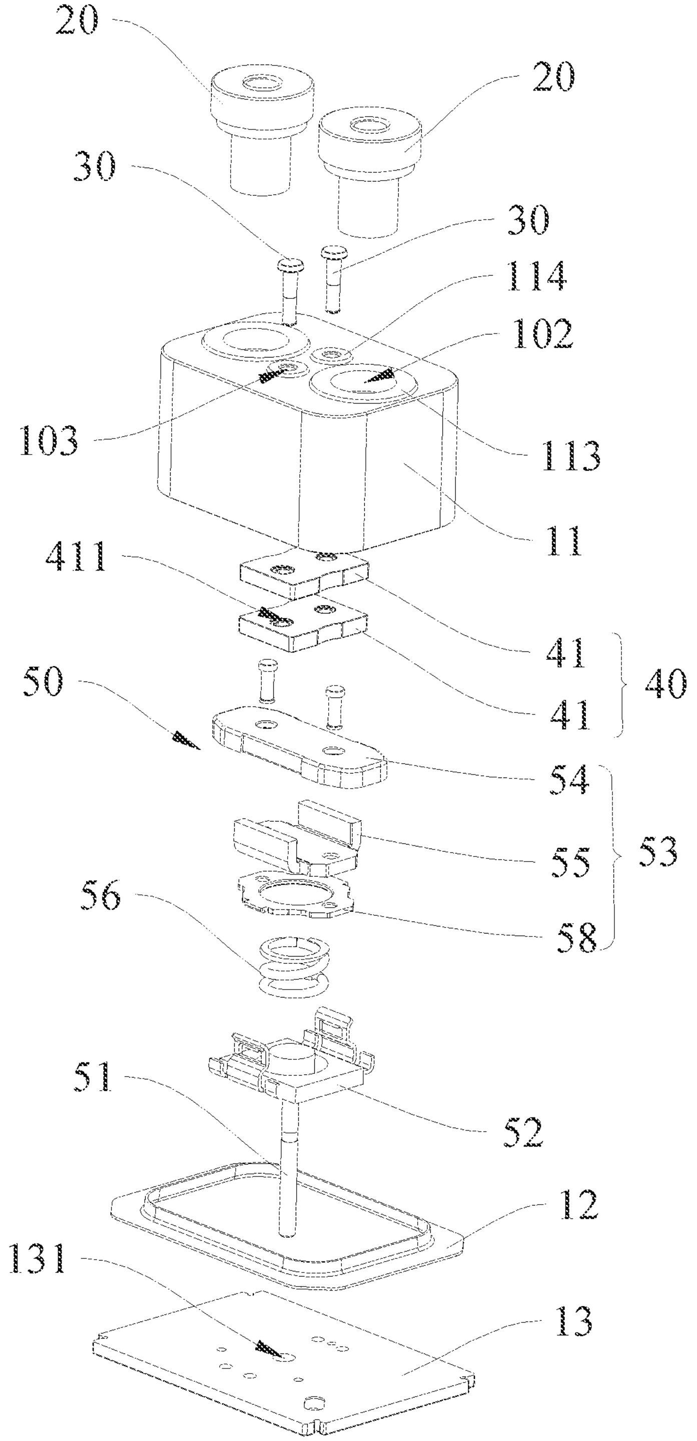
FIG. 4 is an exploded schematic view of FIG. 1.
Figure 5:
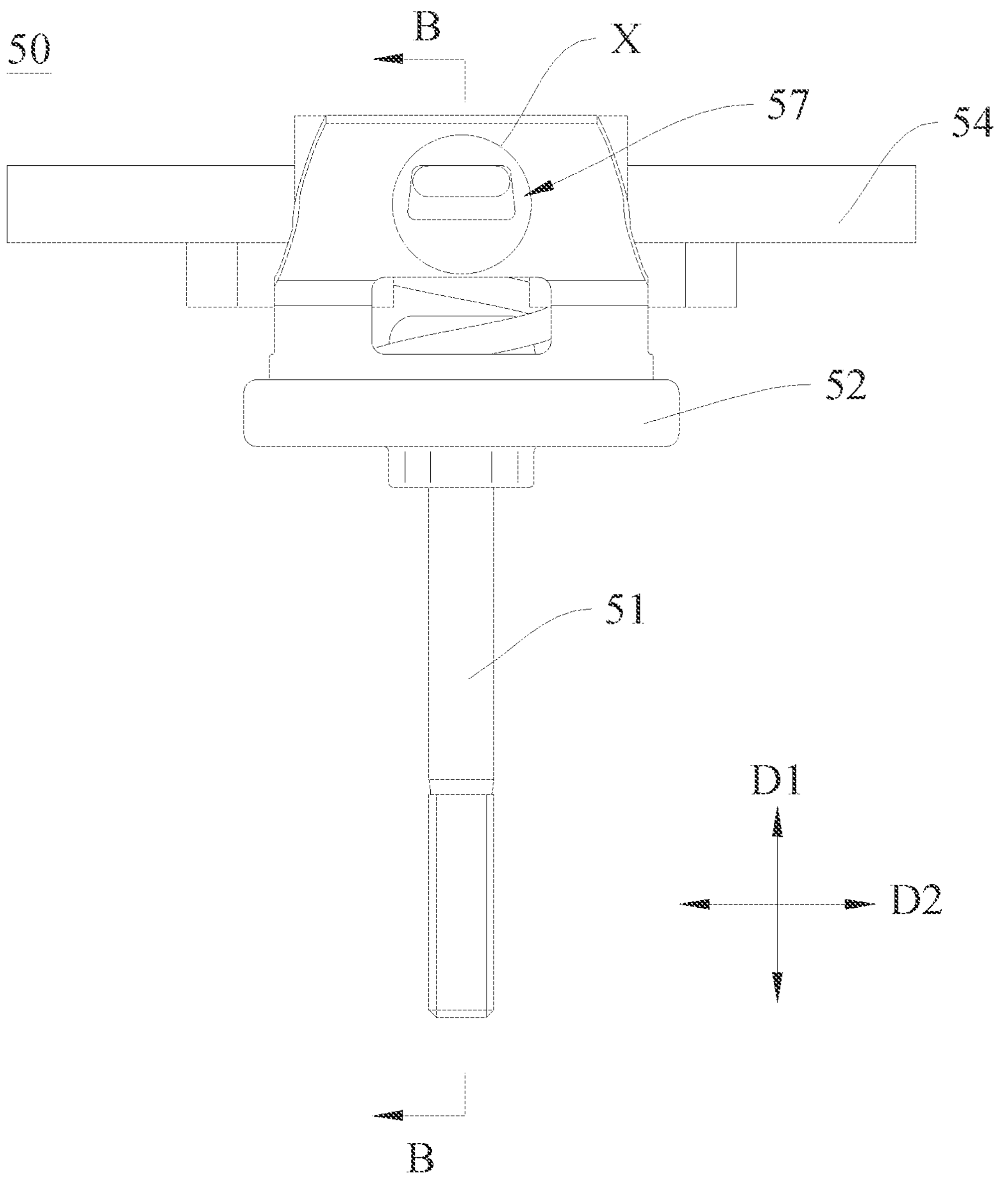
FIG. 5 is a schematic side view of the pushing rod assembly according to the first embodiment of the present disclosure.

As shown in FIGS. 1 to 4, 15 and 16, FIG. 1 is a schematic perspective view of the relay according to the first embodiment of the present disclosure, in which the coil and the magnetic circuit structure are omitted. FIG. 2 shows a schematic plan view of FIG. 1. FIG. 3 shows a cross-sectional view of A-A in FIG. 2. FIG. 4 is an exploded schematic view of FIG. 1. FIG. 15 is a perspective view of FIG. 1, in which the insulating cover is omitted. FIG. 16 is a cross-sectional view taken along line C-C in FIG. 2.

The sealing unit 1400 of the embodiment of the present disclosure includes a contact container 10, a pair of the static contact leading-out terminals 20, a connector 30, a first magnetizer 40 and a pushing rod assembly 50. The contact container 10 has a contact chamber 101, a pair of first through holes 102 and a second through hole 103. Both the first through holes 102 and the second through hole 103 are communicated with the contact chamber 101. The pair of the static contact leading-out terminals 20 connects to the contact container 10, and pass through the pair of first through holes 102 in one-to-one correspondence. The connector 30 passes through the second through hole 103, and includes a first end 31 and a second end 32, and the first end 31 is connected to the wall of the contact container 10. The first magnetizer 40 is disposed inside the contact chamber 101, and connected to the second end 32 of the connector 30. The pushing rod assembly 50 includes a movable component 53 having a movable contact piece 54. The movable component 53 movably provided in the contact chamber 101, to make the movable contact piece 54 come into contact with or separate from the pair of the static contact leading-out terminals 20. The first magnetizer 40 is disposed at a side of the movable contact piece 54 facing the static contact leading-out terminals 20.

It can be understood that, in the relay of the embodiment of the present disclosure, the first magnetizer 40 is disposed over the movable contact piece 54, when two ends of the movable contact piece 54 contact the pair of the static contact leading-out terminals 20, the current flows through the movable contact piece 54, thus forming a magnetic loop around the movable contact piece 54 at the periphery of the movable contact piece 54 in the longitudinal direction D2. Because of the existence of the first magnetizer 40, most of the magnetic field of the magnetic loop will gather in the first magnetizer 40 and magnetize the first magnetizer 40. In this way, an electromagnetic attraction force along the contact pressure direction will be generated between the first magnetizer 40 and the movable contact piece 54 where the current flows. The electromagnetic attraction can resist the electro-dynamic repulsion force generated due to short-circuit current between the movable contact piece 54 and the static contact leading-out terminals 20, and ensure that the movable contact piece 54 and the static contact leading-out terminals 20 do not bounce off.

In addition, the first magnetizer 40 is connected to the contact container 10 by means of the connector 30. On the one hand, the first magnetizer 40 is connected to the contact container 10, instead of following the pushing rod assembly 50, and the electromagnetic attraction of the movable contact piece 54 to the first magnetizer 40 acts on the contact container 10 through the connector 30. Because the position of the contact container 10 is relatively fixed, which can avoid the movable contact piece 54 and the static contact leading-out terminals 20 from bouncing off due to the insufficient holding force of the pushing rod assembly 50, and avoid the relay from burning and exploding. On the other hand, the contact container 10 is provided with a second through hole 103, and the connector 30 passes through the second through hole 103, so that the connector 30 is connected with the contact container 10, and the first magnetizer 40 is connected with the connector 30. The first magnetizer 40 is connected to the contact container 10 through the connector 30 instead of directly connecting to the contact container 10, so that the connection process is unobstructed and visual, which is convenient for operation and ensures the reliability of the connection.

Further, the movable component 53 further includes a second magnetizer 55 provided inside the contact chamber 10. The second magnetizer 55 fixedly connects with the movable contact piece 5, and the second magnetizer 55 is located on the side of the movable contact piece 54 facing away from the first magnetizer 40, the second magnetizer 55 is used to form a magnetic loop with the first magnetizer 40.

When two ends of the movable contact piece 54 are in contact with the pair of the static contact leading-out terminals 20, the second magnetizer 55 moving together with the movable contact piece 54 is close to or in contact with the first magnetizer 40, thereby forming a magnetic loop around the movable contact piece 54 and between the first magnetizer 40 and the second magnetizer 55. When a short-circuit current flows through the movable contact piece 54, an electromagnetic attraction force along the contact pressure direction is generated between the first magnetizer 40 and the second magnetizer 55. The electromagnetic attraction can resist the electro-dynamic repulsion force generated due to short-circuit current between the movable contact piece 54 and the static contact leading-out terminals 20, and ensure that the movable contact piece 54 and the static contact leading-out terminals 20 do not bounce off.

It should be noted that the first magnetizer 40 and the second magnetizer 55 are respectively located at two sides of the movable contact piece 54. When a current flows through the movable contact piece 54, the electromagnetic attraction force between the first magnetizer 40 and the second magnetizer 55 is a direct electromagnetic attraction force, which is greater than the electromagnetic attraction force between the first magnetizer 40 and the movable contact piece 54 after magnetization. Therefore, it can more effectively resist the electro-dynamic repulsion force caused by short-circuit current between the movable contact piece 54 and the static contact leading-out terminals 20, thus effectively improving the anti-short-circuit ability.

As shown in FIG. 16, when both ends of the movable contact piece 54 are disconnected from the pair of the static contact leading-out terminals 20, because no current flows in the movable contact piece 54, so there is no electromagnetic attraction between the first magnetizer 40 and the second magnetizer 55.

It can be understood that the terms "include" and "has" in the embodiments of this disclosure and any variations thereof are intended to cover non-exclusive inclusion. For example, a process, method, system, product or equipment that contains a series of steps or units is not limited to the listed steps or units, but optionally includes steps or units not listed in the lists, or optionally includes other steps or components inherent to these processes, methods, products or equipment.

The contact container 10 includes a yoke plate 13 and an insulating cover 11*a*. The insulating cover 11*a* covers one side of the yoke plate 13 to form the contact chamber 101 of the contact container 10. In one embodiment, the insulating cover 11*a* includes a top wall and a side wall. The first through holes 102 and the second through hole 103 are both opened in the top wall. The yoke plate 13 has a third through hole 131 communicated with the contact chamber 101. The pushing rod assembly 50 movable passes through the third through hole 131. Two yoke clamps 1320 surround the insulating cover 11*a*.

The insulating cover 11*a* includes a ceramic cover 11 and a frame piece 12. The ceramic cover 11 connects with the yoke plate 13 through the frame piece 12. The frame piece 12 can be a metal piece with an annular structure, such as iron-nickel alloy, and one end of the frame piece 12 is connected to the opening edge of the ceramic cover 11, for example, by laser welding, brazing, resistance welding, gluing, etc. The other end of the frame piece 12 is connected to the yoke plate 13 by laser welding, brazing, resistance welding, gluing, etc. Providing the frame piece 12 between the ceramic cover 11 and the yoke plate 13 can facilitate the connection between the ceramic cover 11 and the yoke plate 13.

Two arc extinguishing magnets 1310 are located on both sides of the ceramic cover 11, and two yoke clamps 1320 surround the ceramic cover 11 and two arc extinguishing magnets 1310.

The ceramic cover 11 includes a top wall 111 and a side wall 112. One end of the wall 112 is connected around the periphery of the top wall 111. The other end of the side wall 112 is connected to the yoke plate 13 through the frame piece 12. The first through holes 102 and the second through hole 103 are both defined in the top wall 111. The first end 31 of the connector 30 connects to the outer surface of the top wall 111.

It can be understood that one of the pair of the static contact leading-out terminals serves as a terminal for the current to flow in and the other as a terminal for the current to flow out. The static contact leading-out terminals 20 pass through the first through holes 102, a part of the static contact leading-out terminals 20 extend into the contact chamber 101 for contact with or separation from the movable contact piece 54, and a part of the static contact leading-out terminals 20 are exposed on the outer surface of the ceramic cover 11.

The bottom of the static contact leading-out terminals 20 serve as static contacts, and both ends of the movable contact piece 54 along its length direction D2 can serve as movable contacts. The movable contacts at both ends of the movable contact piece 54 can protrude from other parts of the movable contact piece 54 or be flush with other parts.

It can be understood that the static contact can be integrally or separately arranged at the bottom of the static contact leading-out terminals 20, and the movable contacts can be integrally or separately arranged at both ends of the movable contact piece 54 along its length direction D2.

The second through hole 103 may arranged between two first through holes 102. That is, the connector 30 is located between the pair of the static contact leading-out terminals 20. The number of the second through holes 103 may be one or more. In this embodiment, the number of the second through hole 103 is two, but it is not limited to this.

Accordingly, the number of the connector 30 can be one or more. In this embodiment, the number of the connector 30 is two, but it is not limited to this.

Please continue to refer to FIG. 4. In the outer surface of the top wall 111 of the ceramic cover 11, the first metallization layer 113 is formed around the periphery of the first through holes 102, and the second metallization layer 114 is formed around the periphery of the second through hole 103. The static contact leading-out terminals 20 are welded with the top wall 111 through the first metallization layer 113. The first ends 31 of the connectors 30 is welded with the top wall 111 through the second metallization layer 114.

Compared with the inner surface of the ceramic cover 11, the outer surface of the top wall 111 of the ceramic cover 11 is easier to form a welding plane. Furthermore, since the top wall 111 of the ceramic cover 11 needs to provide static contact leading-out terminals 20, when the static contact leading-out terminals 20 and the top wall 111 are welded, it is also necessary to provide a metallization layer around the first through holes 102. Therefore, when processing the first metallization layer 113 of the first through holes 102, the second metallization layer 114 of the second through hole 103 can be processed together. Therefore, by welding the connectors 30 on the outer surface of the top wall 111 of the ceramic cover 11, the metallization layer can be processed only on the outer surface of the top wall 111 without processing the metallization layer on the inner surface of the top wall 111, which is convenient for processing and simplifies the processing steps.

The first magnetizer 40 is spaced from the inner surface of the top wall 111. That is, the length of the connectors 30 is greater than the sum of the thickness of the top wall 111 and the thickness of the first magnetizer 40, so that the first magnetizer 40 is hung at the top wall 111 of the ceramic cover 11 through the connectors 30.

The first magnetizer 40 is spaced from the inner surface of the top wall 111, thus there is a gap between the first magnetizer 40 and the inner surface of the top wall 111. Since the first magnetizer 40 is not in direct contact with the inner surface of the top wall 111, the first magnetizer 40 does not affect the creepage distance of the pair of the static contact leading-out terminals 20.

Please continue to refer to FIG. 3 and FIG. 4. The first magnetizer 40 includes a plurality of magnetic conductive sheets 41 superimposed with each other. The magnetic conductive sheets 41 are connected with the second ends 32 of the connectors 30. Each magnetic conductive sheet 41 is provided with an opening 411. The connectors 30 pass through the opening 411 and are riveted with the lowest magnetic conductive sheets 41.

Of course, when the first magnetizer 40 includes a plurality of magnetic conductive sheets 41 superposed, the opening 411 of the magnetic conductive sheets 41 located at the bottom can also be a blind hole. While the openings 411 of the remaining magnetic conductive sheets 41 are through holes. The connectors 30 pass through the openings 411 of the remaining magnetic conductive sheets 41, extend into the blind holes of the magnetic conductive sheets 41 located at the bottom, and are welded with the magnetic conductive sheets 41.

In addition, in case that there is only one piece of first magnet 40, the first magnet 40 is provided with an opening 411, which can be a through hole or a blind hole. When the opening 411 is a through hole, the connectors 30 are riveted with the first magnetizer 40 after passing through the opening 411. When the opening 411 is a blind hole, solder can be placed in the blind hole. The second end 32 of the connectors 30 extends into the blind hole and is welded with the first magnetizer 40.

As an example, when the short-circuit current reaches above 10 kA, it is necessary to increase the thickness of the first magnetizer 40 to generate greater electromagnetic attraction, thereby ensuring that the electromagnetic attraction between the first magnetizer 40 and the second magnetizer 55 can overcome the repulsive force generated by short-circuit current and prevent the movable contact piece 54 and the static contact leading-out terminals 20 from bouncing off. However, the first magnetizer 40 with larger thickness has a high cost, and it is difficult to connect with the ceramic cover 11.

In this embodiment, because the first magnetizer 40 is connected with the contact container 10 through the connectors 30, the first magnetizer 40 may include multiple pieces of magnetic conductive sheets 41 which are stacked with each other. The connectors 30 connect the contact container 10 through the opening 411 of multiple pieces of magnetic conductive sheets 41. The overall thickness of the first magnetizer 40 can be increased by increasing the number of magnetic conductive sheets 41 with thinner thickness. On the one hand, the thickness of magnetic conductive sheets 41 is relatively thin, and it can be made of thin strip, so the material cost is low, and it is easy to operate. On the other hand, the number of magnetic conductive sheets 41 can be flexibly adjusted according to the short-circuit current.

The top wall 111 and the side wall 112 of the ceramic cover 11 can be separated and connected by welding. It can be understood that, by designing the ceramic cover 11 as a separated structure of the top wall 111 and the side wall 112, it is more convenient to connect the connectors 30 with the top wall 111. Of course, the top wall 111 and the side wall 112 can also be connected by bonding.

Specifically, because the top wall 111 is sheet-shaped, the sheet-shaped structure is easier to form the first through holes 102, the second through hole 103, the first metallization layer 113 and the second metallization layer 114 on the top wall 111. Further, the sheet structure is easier to weld the connectors 30 and the top wall 111, as well as the static contact leading-out terminals 20 and the top wall 111.

Of course, the top wall 111 and the side wall 112 of the ceramic cover 11 can also be integrated.

There are many ways to connect the second end 32 of the connectors 30 with the first magnetizer 40, such as welding, riveting and gluing.

In this embodiment, the second end 32 of the connectors 30 is riveted with the first magnetizer 40. Specifically, the second end 32 of the connectors 30 and the first magnetizer 40 are connected by expanded riveting.

It can be understood that the first magnetizer 40 can be straight line shape and the second magnetizer 55 can be U-shaped. The first magnetizer 40 and the second magnetizer 55 can be made of iron, cobalt, nickel and their alloys.

Of course, it can be understood that the second magnetizer 55 can also include a plurality of superposed magnetic conductive sheets, or the second magnetizer 55 includes a plurality of U-shaped magnetizers arranged side by side.

As shown in FIG. 14 and FIG. 16, the sealing unit 1400 also includes a metal cover 1410, which is connected to the side of the yoke plate 13 facing away from the insulating cover 11*a*. The metal cover 1410 covers the third through hole 131 on the yoke plate 13. The metal cover 1410 and the yoke plate 13 enclose a chamber for accommodating the stationary iron core 1230 and the movable iron core 1240 of the electromagnet unit 1200, which will be described in detail below.

As shown in FIG. 4 and FIG. 16, the pushing rod assembly 50 also includes a rod 51, a base 52 and an elastic piece 56. The rod 51 movably passes through the third through hole 131 of the yoke plate 13. One end of the rod 51 is connected with the base 52, and the other end of the rod 51 is connected with the movable iron core 1240 of the electromagnet unit 1200. The elastic piece 56 abuts against the base 52 at one end and abuts against the movable component 53 at the other end. The elastic piece 56 provides elastic force, so that the movable contact piece 54 tends to move towards the static contact leading-out terminals 20.

It can be understood that the elastic piece 56 can be a spring, but it is not limited to this.

Of course, in other embodiments, the pushing rod assembly 50 can also have other structures, which are not listed here.

As shown in FIG. 16, the electromagnet unit 1200 includes a bobbin 1210, a coil 1220, a stationary iron core 1230, a movable iron core 1240 and a reset piece 1250. The bobbin 1210 has a hollow cylinder shape and is made of insulating material. The metal cover 1410 is installed in the bobbin 1210. The coil 1220 surrounds the bobbin 1210. The stationary iron core 1230 is fixedly arranged in the metal cover 1410, and part of the stationary iron core 1230 extends into the third through hole 131. The stationary iron core 1230 has a through hole 1231, which corresponds to the third through hole 131, for the rod 51 to pass through. The movable iron core 1240 is movably arranged in the metal cover 1410 and is opposite to the stationary iron core 1230. The moving iron core 1240 is connected with the rod 51 and used to be attracted by the stationary iron core 1230 when the coil 1220 is powered on. The movable iron core 1240 and the rod 51 can be connected by screwing, riveting, welding or other means.

The reset piece 1250 is located inside the metal cover 1410 and between the stationary iron core 1230 and the movable iron core 1240, and is used to reset the movable iron core 1240 when the coil 1220 is powered off. The reset piece 1250 can be a spring and is sleeved outside the rod 51.

Figure 6:
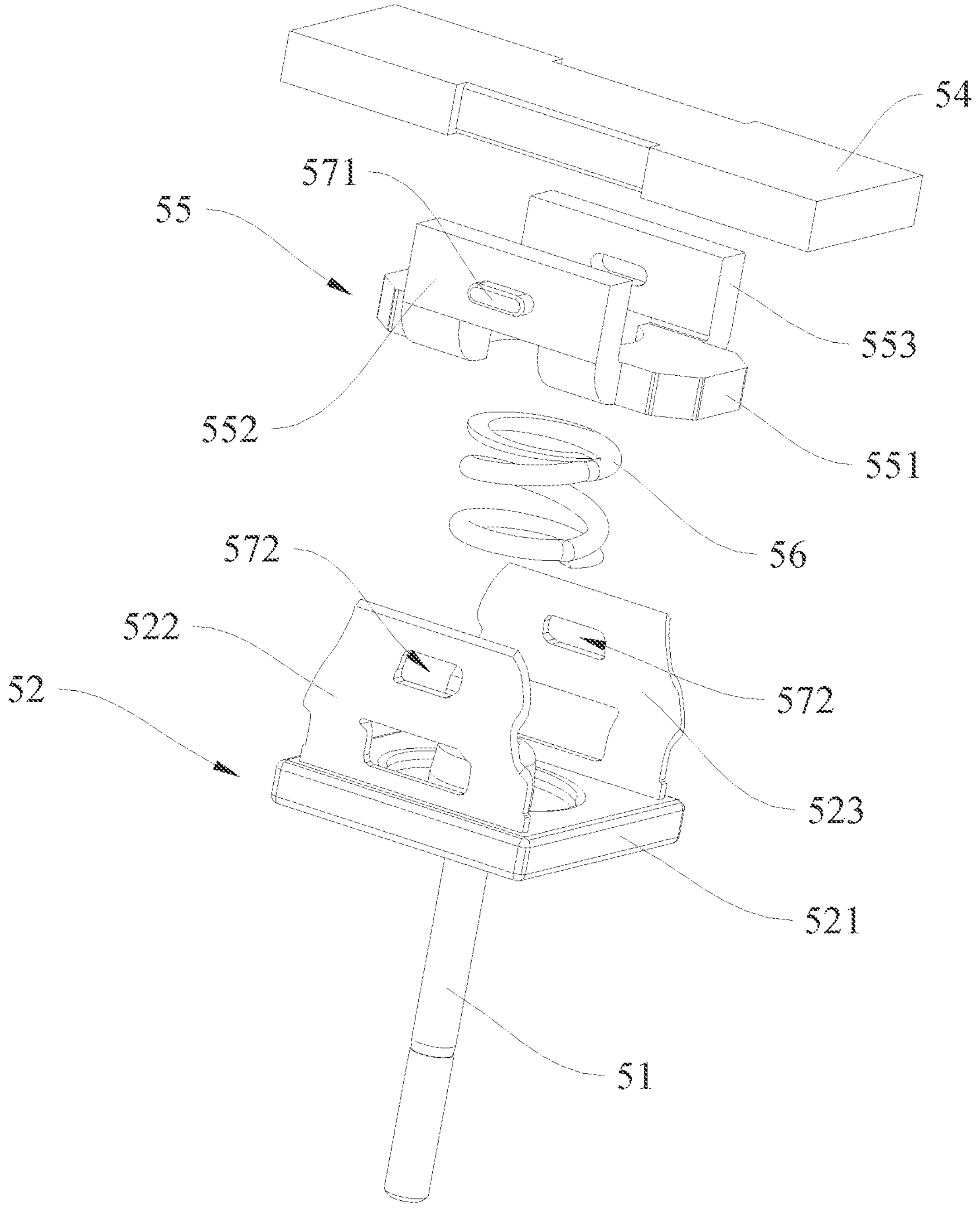
FIG. 6 is an exploded schematic view of FIG. 5.
Figure 7:
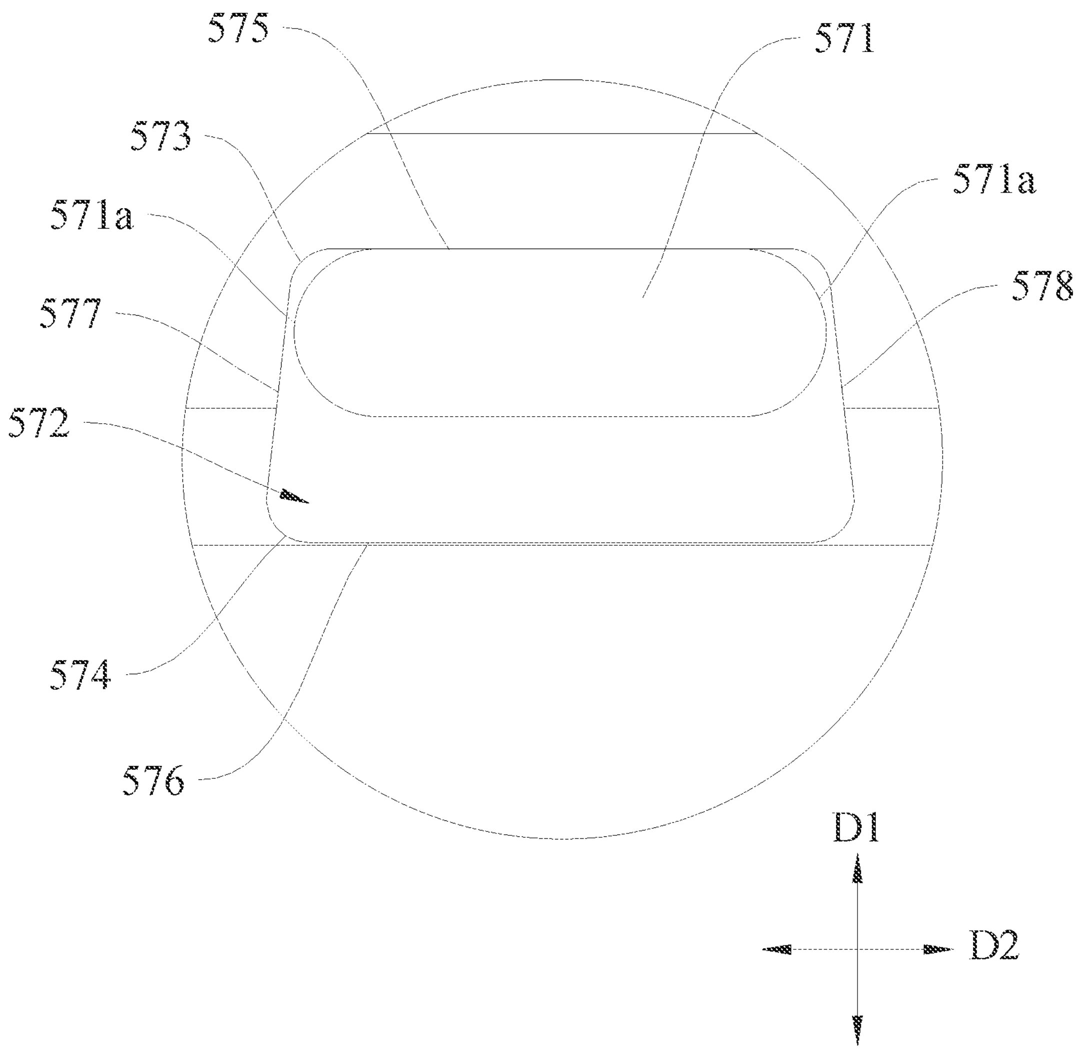
FIG. 7 shows a partial enlarged view of X in FIG. 5.
Figure 8:
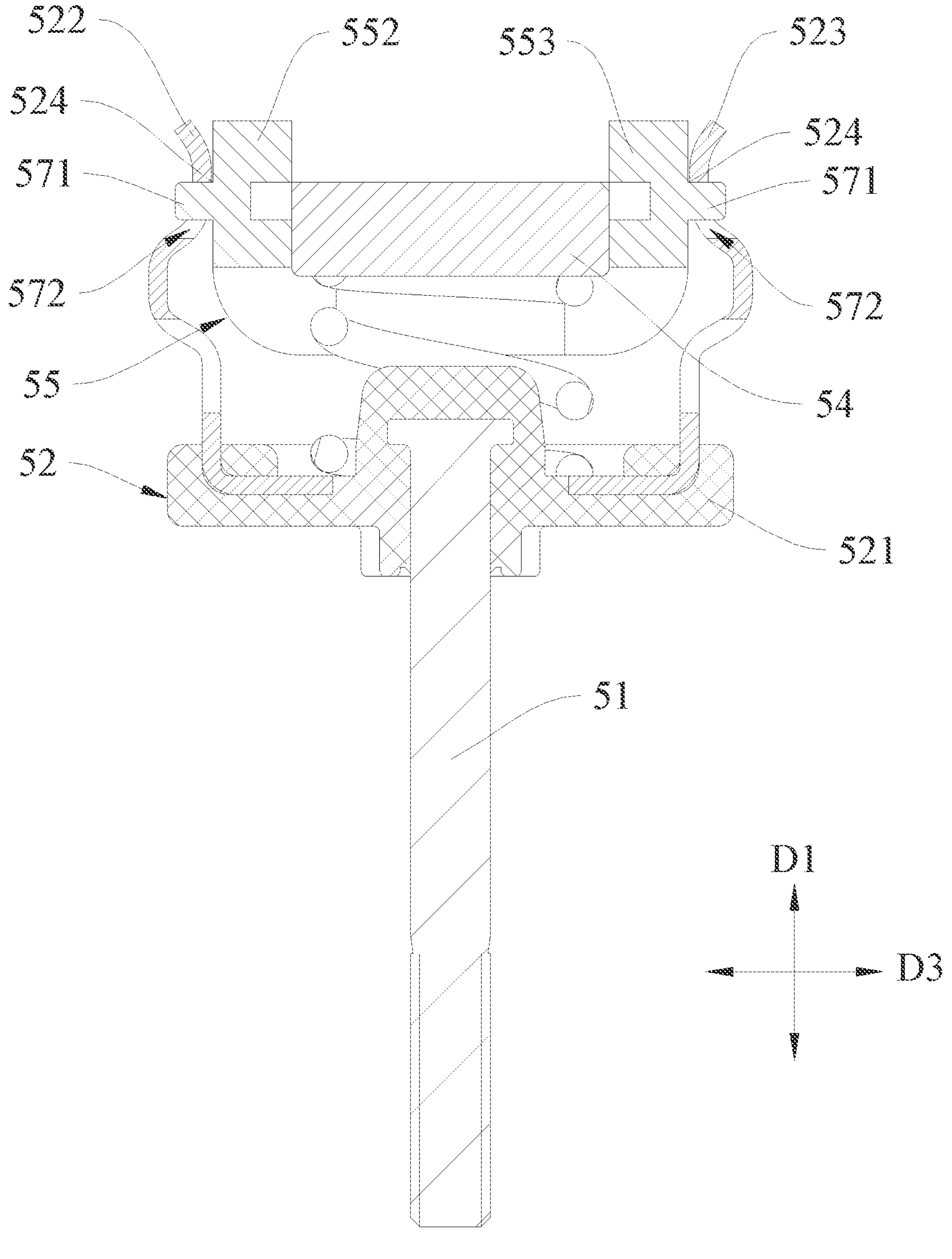
FIG. 8 is a cross-sectional view taken along line B-B in FIG. 5.

As shown in FIGS. 5 to 8, FIG. 5 is a schematic side view of the pushing rod assembly according to the first embodiment of the present disclosure. FIG. 6 is an exploded schematic view of FIG. 5. FIG. 7 shows a partial enlarged view of X in FIG. 5. FIG. 8 is a cross-sectional view taken along line B-B in FIG. 5.

The pushing rod assembly 50 also includes a limit structure 57. The limit structure 57 is connected to the base 52 and the movable component 53 to limit the moving range of the movable component 53 relative to the base 52. The limit structure 57 includes a limit hole 572 and a limit member 571 cooperate with each other. The limit hole 572 includes a first end 573 and a second end 574 disposed oppositely in the movement direction D1 of the movable contact piece 54. The aperture of the second end 574 is larger than the aperture of the first end 573. The limit member 571 passes through the limit hole 572 and can move between the first end 573 and the second end 574. The limit member 571 is located at the first end 573 of the limit hole 572 when the movable contact piece 54 is separated from the static contact leading-out terminals 20.

In this embodiment, the base 52 is directly in connection with the movable component 53 by the limit structure 57, which makes the assembling between the base and the movable component 53 easier. Moreover, since there are no components above the movable component 53, the motion interference between these components and the first magnetizer 40 is avoided during the overtravel process.

It can be understood that the limit hole 572 may be a through hole or a blind hole.

When the movable contact piece 54 does not in connection with the static contact leading-out terminals 20, under the action of the elastic piece 56, the limit member 571 is located at the first end 573 of the limit hole 572. When the movable contact piece 54 is in contact with the static contact leading-out terminals 20 and during the process of completing the overtravel, the limit member 571 moves from the first end 573 of the limit hole 572 to the second end 574. Since the aperture of the second end 574 of the limit hole 572 is greater than the aperture of the first end 573, the limit hole 572 presents a structure of "one end is big, and the other end is small". In the process of overtravel, the gap between the hole wall of the limit member 571 and the limit hole 572 becomes larger, which can prevent the hole wall of the limit member 571 and the limit hole 572 from rubbing and jamming during the movement of the movable contact piece 54 relative to the base 52. At the same time, the aperture of the first end 573 of the limit hole 572 is small, which does not affect the limit fit between the limit member 571 and the limit hole 572 in the initial state, and prevents the movable contact piece 54 from shaking relative to the base 52.

It should be noted that in order to realize the limit of the movable contact piece 54 and the base 52 in the initial state, the aperture of the first end 573 of the limit hole 572 should be adapted to the shape of the limit member 571. So that when the limit member 571 is located at the first end 573 of the limit hole 572, the limit member 571 can be limited with the hole wall of the limit hole 572.

Please continue to refer to FIGS. 5 to 8, the aperture of the limit hole 572 gradually increases along the direction from the first end 573 to the second end 574 of the limit hole 572. During the overtravel process, when the limit member 571 moves from the first end 573 to the second end 574 of the limit hole 572, the gap between the limit member 571 and the hole wall of the limit hole 572 gradually increases.

Further, the hole wall of the limit hole 572 includes a first plane 575 and a second plane 576 arranged oppositely and a first slope 577 and a second slope 578 arranged oppositely. One ends of the first slope 577 and the second slope 578 connect to two ends of the first plane 575, and the other ends of the first slope 577 and the second slope 578 connect to two ends of the second plane 576.

In this embodiment, the limit hole 572 is roughly an isosceles trapezoid, but it is not limited to this. For example, the shape of the limit hole 572 can also be a common trapezoid, that is, the slopes of the first slope 577 and the second slope 578 are not equal. Or the limit hole 572 can be a triangle, and preferably, the triangle can be an isosceles triangle.

Of course, in other embodiments, along the direction from the first end 573 to the second end 574 of the limit hole 572, the aperture of the limit hole 572 may not be gradually increased. For example, the hole wall of the limit hole 572 may also include equal-diameter segments and enlarged-diameter segments. For example, from the first end 573 to the second end 574, the hole wall of the limit hole 572 can include an enlarged-diameter segment, an equal diameter section, an enlarged-diameter segment, an equal diameter section and so on.

As shown in FIG. 7, the limit member 571 has first arc surfaces 571*a*. The first arc surfaces 571*a* are used to cooperate with the limit hole 572 to realize limitation along a length direction D2 of the movable contact piece 54 when the limit member is located at the first end 573 of the limit hole 572.

In this embodiment, the outer side walls of the limit member 571 are designed to include the first arc surfaces 571*a*. The first arc surfaces 571*a* is in line contact with the hole wall of the limit hole 572, and the line contact can reduce the friction between the limit member 571 and the hole wall of the limit hole 572. When the limit member 571 and the limit hole 572 move relatively, jamming is less likely to occur.

The limit hole 572 is defined in the base 52. The limit member 571 is disposed on the movable component 53. Of course, in other embodiments, the limit hole 572 can also be disposed on the movable component 53, and the limit member 571 is disposed on the base 52.

As shown in FIGS. 5 to 8, in this embodiment, the limit hole 572 is defined in the base 52. The limit member 571 is disposed on the second magnetizer 55. The second magnetizer 55 includes a bottom portion 551, a first side portion 552 and a second side portion 553. The first side portion 552 and the second side portion 553 are connected to both ends of the bottom port 551 along the width direction D3 of the movable contact piece 54. The first side portion 552 and the second side portion 553 are respectively set on the two opposite sides of the width direction D3 of the movable contact piece 54. The first side portion 552 and the second side portion 553 both have the limit member 571.

It can be understood that the direction of motion D1, length D2, and width D3 are perpendicular to each other.

The base 52 includes a base part 521, a first limit piece 522 and a second limit piece 523. Both the first limit piece 522 and the second limit piece 523 are connected to the base part 521 and opposite to each other. The first side portion 552 corresponds to the first limit piece 522, the second side portion 553 corresponds to the second limit piece 523, and both the first limit piece 522 and the second limit piece 523 have the limit hole 572.

Both the surface of the side of the first limit piece 522 towards the first side portion 552 and the surface of the surface of the second limit piece 523 towards the second side portion 553 include the second arc surface 524.

In this embodiment, both the surface of the side of the first limit piece 522 towards the first side portion 552 and the surface of the side of the second limit piece 523 towards the second side portion 553 are designed to include the second arc surface 524, two second arc surfaces 524 are in line contact with the first side portion 552 and the second side portion 553, respectively. Line contact is beneficial for reducing the friction between the first side portion 552 and the first limit piece 522, as well as between the second side portion 553 and the second limit piece 523. When the second magnetizer 55 moves relative to the base 52, it is less prone to jamming, thus avoiding the generation of scratches and contaminating the contact chamber 101 of the relay.

Both the first side portion 552 and the second side portion 553 are located between the first limit piece 522 and the second limit piece 523. The side of the first side portion 552 facing away from the second side portion 553 and the side of the second side portion 553 facing away from the first side portion 552 are both provided with the limit members 571, which protrude outside.

As an example, the limit member 571 can be formed by stamping the side of the first side portion 552 or the second side portion 553, so that the limit member 571 can form a protrusion. The specific position of the protrusion on the first side portion 552 or the second side portion 553 can be flexibly adjusted according to the structure.

In this embodiment, because two limit members 571 are respectively arranged on the side of the first side portion 552 away from the second side portion 553, and the side of the second side portion 553 facing away from the first side portion 552, therefore, the first side portion 552 and the second side portion 553 can fully contact with the first limit piece 522 and the second limit piece 523 respectively, thus ensuring the stability when the second magnetizer 55 and the base 52 are limited, without affecting the magnetic conductivity.

In an embodiment the limit member 571 may be a long strip. When the limit member 571 is located at the first end 573 of the limit hole 572, the side with a larger area contacts the hole wall of the limit hole 572. By contacting the side with a large area of the limit member 571 with the hole wall of the limit hole 572, the movable contact piece 54 is effectively prevented from swinging relative to the base 52 in the initial state, and the probability of rebound of the movable contact piece 54 is reduced.

Figure 9:
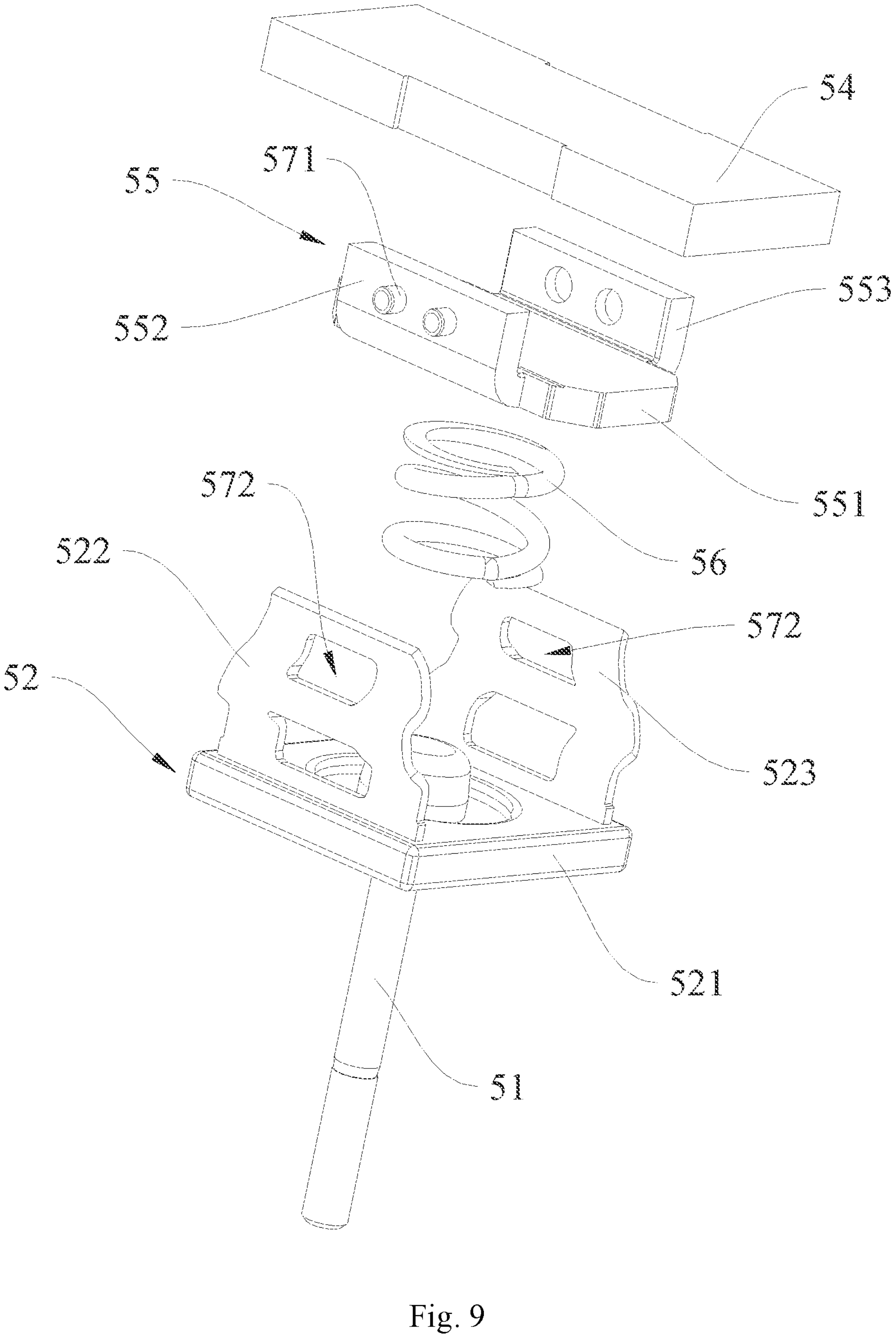
FIG. 9 is an exploded view of the pushing rod assembly according to the second embodiment of the present disclosure.

As shown in FIG. 9, FIG. 9 is an exploded schematic view of the pushing rod assembly 50 according to the second embodiment of the present disclosure. The similarities between the second embodiment and the above-mentioned first embodiment are not repeated here, and the differences are as follows.

The limit member 571 includes two protrusions. Two protrusions are arranged spaced with each other along the length direction D2 of the movable contact piece 54. The design of double protrusions effectively avoids the swing of the movable contact piece 54 relative to the base 52 in the initial state, and reduces the probability of the rebound of the movable contact piece 54.

Figure 10:
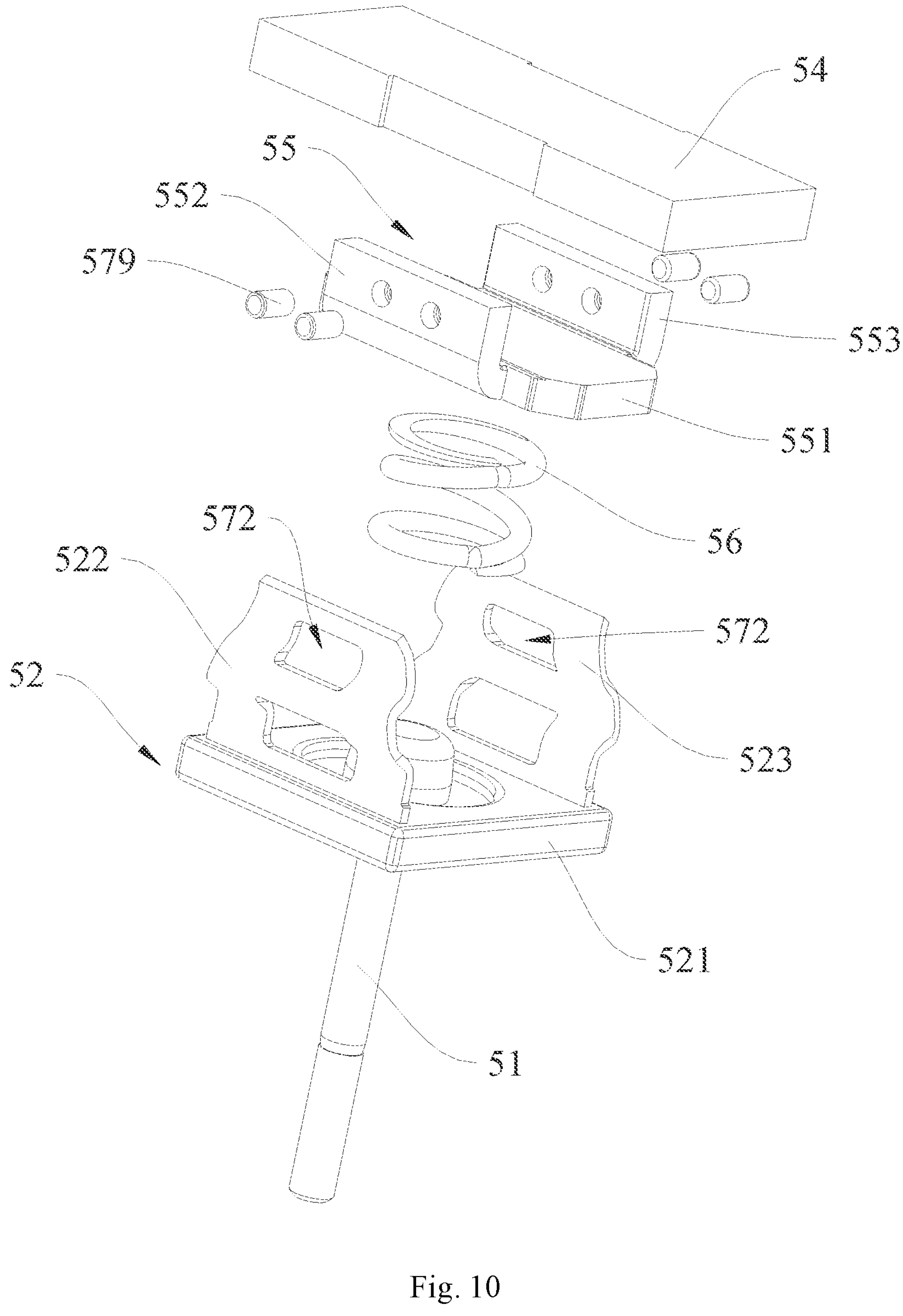
FIG. 10 is an exploded view of the pushing rod assembly according to the third embodiment of the present disclosure.

As shown in FIG. 10, FIG. 10 is an exploded schematic view of the pushing rod assembly 50 according to the third embodiment of the present disclosure. The similarities between the third embodiment and the above-mentioned first embodiment are not repeated, and the differences are as follows.

The limit member 571 is a rivet 579, and the rivet 579 is riveted to the first side portion 552 or the second side portion 553 of the second magnetizer 55.

Figure 11:
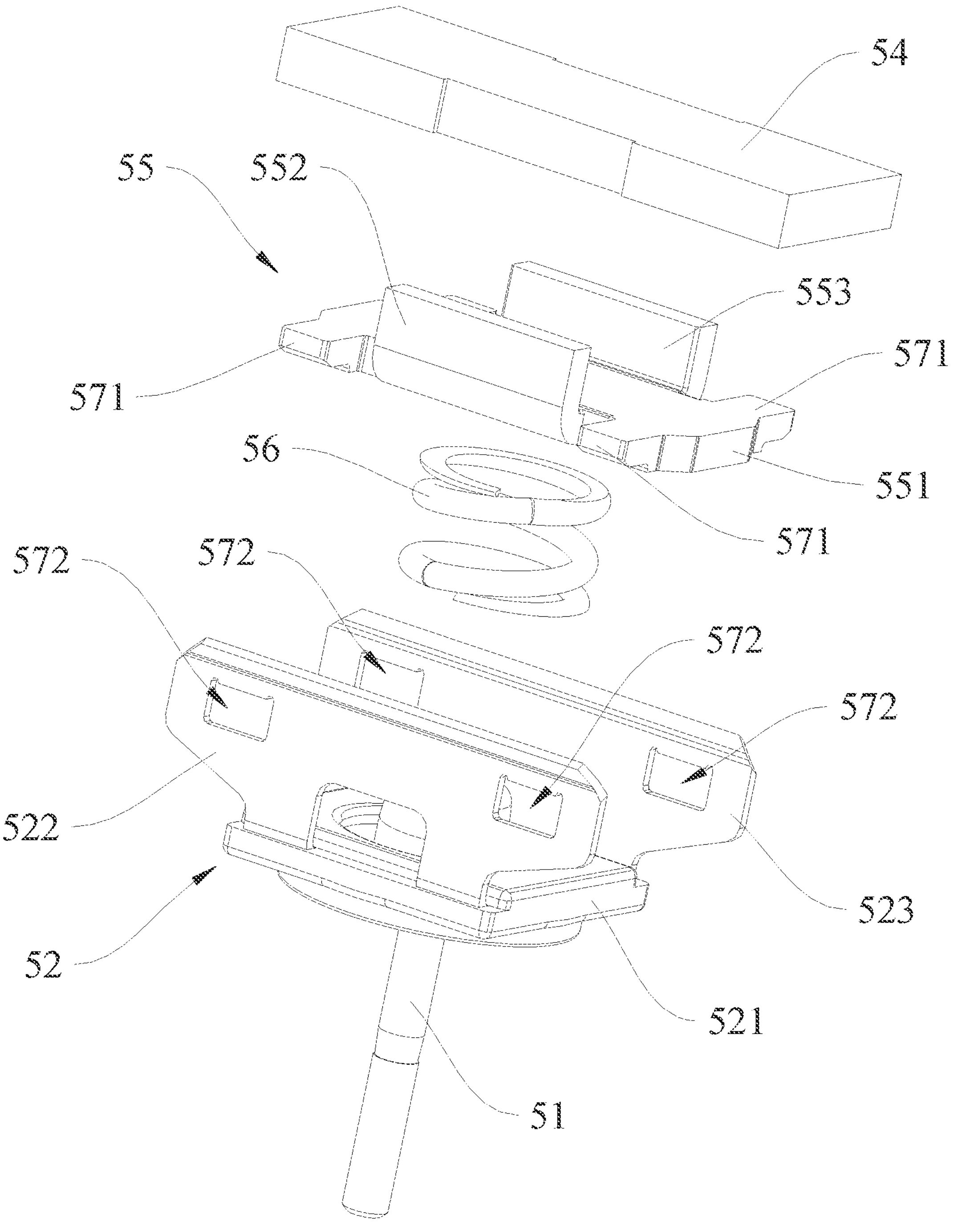
FIG. 11 is an exploded view of the pushing rod assembly according to the fourth embodiment of the present disclosure.

As shown in FIG. 11, FIG. 11 is an exploded schematic view of the pushing rod assembly 50 according to the fourth embodiment of the present disclosure. The similarities between the fourth embodiment and the above-mentioned first embodiment are not repeated, and the difference is that the limit member 571 is arranged on the bottom portion 551 of the second magnetizer 55.

Specifically, the second magnetizer 55 includes a bottom portion 551, a first side portion 552 and a second side portion 553. Along the width direction D3 of the movable contact piece 54, the limit member 571 protrudes from the two opposite sides of the bottom portion 551. The first side portion 552 and the second side portion 553 are respectively connected to both ends of the bottom portion 551 along the width direction D3 of the movable contact piece 54. The first side portion 552 and the second side portion 553 are respectively arranged at two opposite sides of the movable contact piece 54 in the width direction D3.

The base 52 includes a base part 521, a first limit piece 522 and a second limit piece 523. The first limit piece 522 and the second limit piece 523 are both connected to the base part 521, and arranged oppositely. The first limit piece 522 and the second limit piece 523 are both provided with the limit holes 572.

Figure 12:
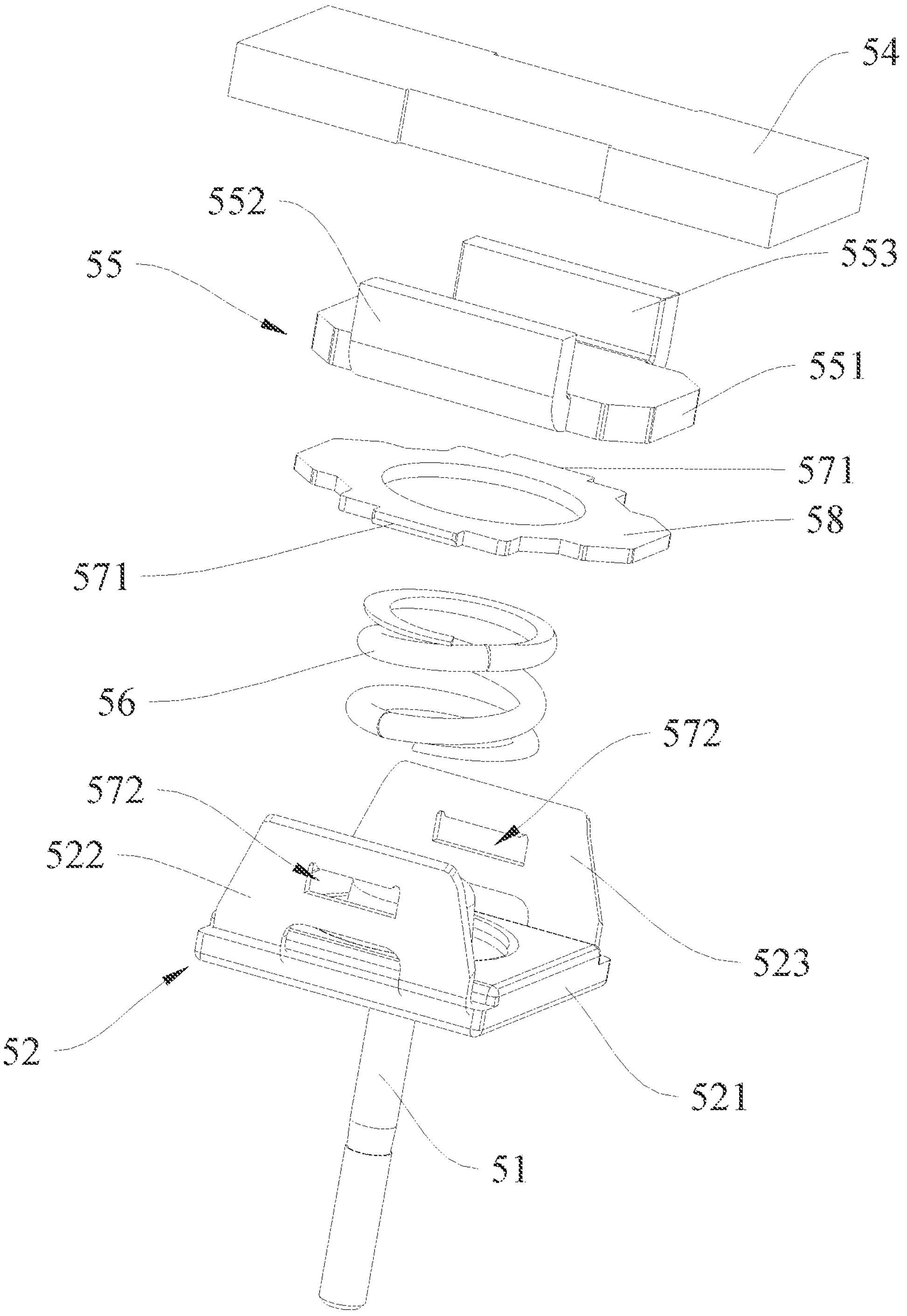
FIG. 12 is an exploded view of the pushing rod assembly according to the fifth embodiment of the present disclosure.

As shown in FIG. 12, FIG. 12 is an exploded schematic view of the pushing rod assembly 50 according to the fifth embodiment of the present disclosure. The similarities between the fifth embodiment and the first embodiment are not repeated here, and the differences are as follows.

The base 52 includes a base part 521, a first limit piece 522 and a second limit piece 523. The first limit piece 522 and the second limit piece 523 are both connected to the base part 521, and arranged oppositely. The first limit piece 522 and the second limit piece 523 are both provided with the limit holes 572. The movable component 53 further includes a fixing piece 58 fixedly connected to the second magnetizer 55. Two opposite sides of the fixing piece 58 are provided with the limit member 571.

Figure 13:
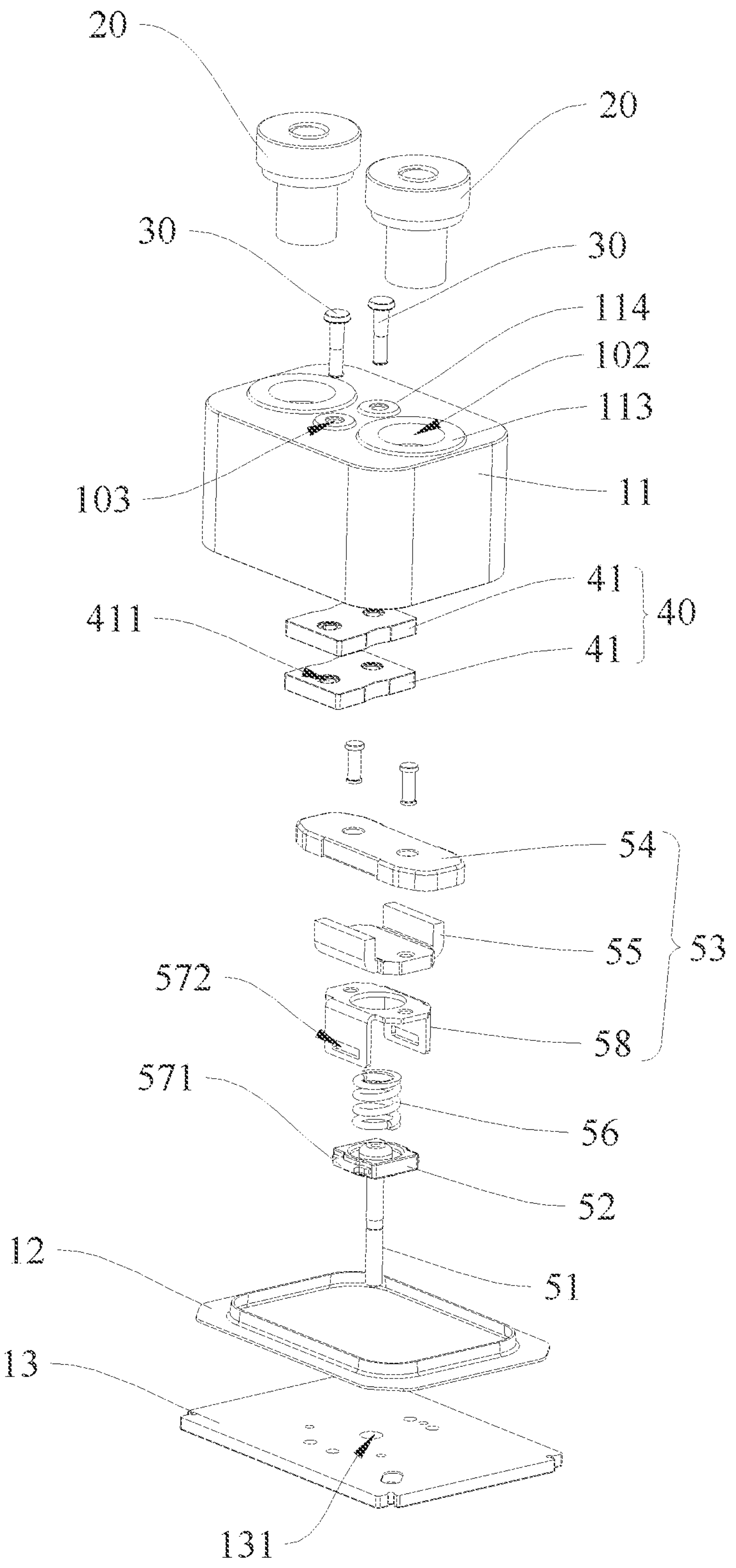
FIG. 13 is an exploded view of the relay according to the second embodiment of the present disclosure.

As shown in FIG. 13, FIG. 13 is an exploded schematic view of the relay in the second embodiment of the present disclosure. The similarity between the relay of the second embodiment and the relay of the first embodiment will not be described in detail, but the differences are as follows.

The limit members 571 protrudes from two opposite sides of the base 52 of the pushing rod assembly 50. The movable component 53 further includes a fixing piece 58 fixedly connected to the movable contact piece 54 and the second magnetizer 55. The fixing piece 58 provided with the limit hole 572.

The fixing piece 58 is inverted U-shaped, and the positions of the first end 573 and the second end 574 of the limit hole 572 provided on the fixing piece 58 are just opposite to those of the limit hole 572 in the above embodiment.

Specifically, as shown in FIG. 13, the first end 573 of the limit hole 572 is located below and the second end 574 is located above. The aperture of the second end 574 is greater than that of the first end 573.

As shown in FIG. 9 to FIG. 12, the first end 573 of the limit hole 572 is located at the top and the second end 574 is located at the bottom.

In the relay of the embodiment of the present disclosure, on the one hand, the first magnetizer 40 is connected to the contact container 10 instead of following the pushing rod assembly 50, thus the electromagnetic attraction of the movable contact piece 54 to the first magnetizer 40 acts on the contact container 10 through the connector 30, and because the position of the contact container 10 is relatively fixed, which can prevent the movable contact piece 54 and the static contact leading-out terminals 20 from bouncing off due to the insufficient holding force of the pushing rod assembly 50, and cause the relay to burn and explode. On the other hand, the embodiment of the present disclosure is provided with the connector 30, and the first magnetizer 40 is connected to the contact container 10 through the connector 30, instead of directly connecting with the contact container 10, so that the connection process is unobstructed and visualized, which is convenient for operation and ensures the reliability of the connection.

In the related art, in order to prevent the contacts of the relay from bouncing off under short-circuit current, electromagnetic structures such as follow-up anti-short-circuit rings are usually installed. Specifically, the first magnetizer and the second magnetizer are arranged on the pushing rod assembly of the relay. When the electro-dynamic repulsion force is generated by short-circuit current, the first magnetizer generates electromagnetic attraction to the second magnetizer, and the second magnetizer is fixed with the movable contact piece, thus ensuring that the movable contact piece does not bounce off.

However, because the pushing rod assembly needs to be supported by the holding force of the movable iron core, which is maintained by the electromagnetic force generated by the energized coil, the holding force used to support the anti-short circuit ring is limited due to the limited power consumption and holding force of the coil. Therefore, when the short-circuit current reaches a certain value, the second magnetizer also has an electromagnetic attraction to the first magnetizer. When the holding force of the movable iron core cannot support the electromagnetic attraction of the second magnetizer to the first magnetizer, the contacts will still bounce off. Further, in the related art, the holding force of the movable iron core is improved by enlarging the coil, which will cause an increase in relay volume.

Therefore, the embodiment of the disclosure also provides a relay, which may improve anti-short-circuit ability of the relay and prevent the relay from burning and exploding under the action of strong arc.

The relay of the embodiment of the present disclosure includes a contact container, a pair of the static contact leading-out terminals, a connector, a first magnetizer and a pushing rod assembly. The contact container has a contact chamber, a pair of the first through holes and a second through hole. The first through holes and the second through hole are both communicated with the contact chamber. The pair of the static contact leading-out terminals pass through the pair of first through holes in one-to-one correspondence and connect to the contact container; the connector pass through the second through hole, and include a first end and a second end, the first end connects to the contact container. The first magnetizer is provided in the contact chamber and connects to the second end of the connector; the pushing rod assembly includes a movable contact piece and a second magnetizer connected to the movable contact piece. the movable contact piece is provided in the contact chamber and configured to come into contact with or separate from the pair of static contact leading-out terminals. the first magnetizer is arranged at the side of the movable contact piece facing the static contact leading-out terminals. the second magnetizer is arranged in the contact chamber and located at the side of the movable contact piece facing away from the first magnetizer. the second magnetizer is configured to form a magnetic loop with the first magnetizer.

According to some embodiments of the present disclosure, the second through hole is disposed between the pair of the first through hole.

According to some embodiments of the present disclosure, the contact container includes a yoke plate having a third through hole communicated with the contact chamber, the pushing rod assembly movably passes through the third through hole; and an insulating cover connected to the yoke plate; wherein both the first through holes and the second through hole are formed on the insulating cover, the first end of the connector connects with an outer surface of the insulating cover.

According to some embodiments of the present disclosure, the insulating cover includes a top wall and a side wall, one end of the side wall connects to the top wall, and the other end of the side wall connects to the yoke plate, both the first through holes and the second through hole are formed on the top wall.

According to some embodiments of the present disclosure, the insulating cover includes a ceramic cover and a frame piece, the ceramic cover includes a top wall and a side wall, the side wall connects to the yoke plate through the frame piece; wherein the outer surface of the top wall at the periphery of the first through holes is provided with a first metallization layer, the outer surface of the top wall at the periphery of the second through hole is provided with a second metallization layer; the static contact leading-out terminals are welded to the top wall through the first metallization layer. The first end of the connector is welded to the top wall through the second metallization layer.

According to some embodiments of the present disclosure, the top wall and the side wall are integrated; or, the top wall and the side wall are separated.

According to some embodiments of the present disclosure, the first magnetizer is spaced from the inner surface of the top wall.

According to some embodiments of the present disclosure, the second end of the connector and the first magnetizer are riveted or welded or glued together.

According to some embodiments of the present disclosure, the first magnetizer includes a plurality of magnetic conductive sheets superposed with each other, the magnetic conductive sheets are connected with the second end of the connector.

According to some embodiments of the present disclosure, the pushing rod assembly further includes: a base; an elastic piece, the elastic piece abuts on the base at one end, and abuts on the movable component consisting of the movable contact piece and the second magnetizer at the other end. the elastic piece provides elastic force to make the movable contact piece tend to move towards the static contact leading-out terminals; a limit structure connected to the base and the movable component and used to limit a movement range of the movable component relative to the base; the limit structure includes a limit hole and a limit member cooperated with each other. The limit hole includes a first end and a second end along an opposite direction of the movement of the movable contact piece, the limit member passes through the limit hole and can move between the first end and the second end; when the movable contact piece is separated from the static contact leading-out terminals, the limit member is located at the first end of the limit hole.

According to some embodiments of the present disclosure, the aperture of the second end is greater than the aperture of the first end.

According to some embodiments of the present disclosure, the limit member has first arc surfaces, and the first arc surfaces are used to cooperate with the limit hole to realize limitation along a length direction of the movable contact piece when the limit member is located at the first end of the limit hole.

According to some embodiments of the present disclosure, the limit member is a rivet, which is riveted to the second magnetizer.

According to some embodiments of the present disclosure, the movable component further includes a fixing piece fixedly connected to the second magnetizer. The limit member is provided on one of the fixing piece and the base, and the limit hole is formed in the other one of the fixing piece and the base.

Compared with the prior art, the embodiment of the present disclosure has following advantages or beneficial effects: the relay of the embodiment of the present disclosure is provided with a connector, the first magnetizer is connected to the contact container by the connector. On the one hand, the first magnetizer is connected to the contact container instead of following the pushing rod assembly, so that the electromagnetic attraction of the second magnetizer to the first magnetizer acts on the contact container through the connector, and because the position of the contact container is relatively fixed, which can prevent the movable contact piece and the static contact leading-out terminals from bouncing off due to the insufficient holding force of the pushing rod assembly, and cause the relay to burn and explode. On the other hand, the embodiment of the present disclosure is provided with a second through hole, the connector passes through the second through hole and is connected with the contact container, and the first magnetizer is connected with the connector. The first magnetizer connects the contact container through the connector instead of directly connecting with the contact container, which makes the connection process unobstructed and visual, which is convenient for operation and ensures the reliability of the connection.

The following is a detailed description with the attached drawings.

As shown in FIGS. 14 to 16, FIG. 14 is an exploded view of the relay according to the first embodiment of the present disclosure. The relay includes a shell 1100, an electromagnet unit 1200, an arc extinguishing unit 1300 and a sealing unit 1400. The sealing unit 1400 is disposed inside the shell 1100. The top of the static contact leading-out terminals 20 of the sealing unit 1400 is exposed on the outer surface of the shell 1100 through the exposure hole 1130 of the shell 1100. Both the electromagnet unit 1200 and the arc extinguishing unit 1300 are arranged inside the shell 1100.

As an example, the shell 1100 includes a first shell 1110 and a second shell 1120, and the first shell 1110 and the second shell 1120 are clamped to form a chamber for accommodating the electromagnet unit 1200, the arc stretching unit 1300 and the sealing unit 1400.

The arc extinguishing unit 1300 is used to extinguish the arc generated between the static contact leading-out terminals 20 and the movable contact piece of the sealing unit 1400.

As an example, the arc extinguishing unit 1300 includes two arc extinguishing magnets 1310. The arc extinguishing magnet 1310 may be a permanent magnet, each of the arc extinguishing magnet 1310 may be generally rectangular in shape. Two arc extinguishing magnets 1310 are respectively arranged on both sides of the insulating cover and are oppositely arranged along the length direction D2 of the movable contact piece.

A magnetic field can be formed around the static contact leading-out terminals and the movable contact piece by providing two arc stretching magnets 1310 opposite to each other. Therefore, the arc generated between the static contact leading-out terminals and the movable contact piece will be elongated in the direction away from each other under the action of the magnetic field, thus realizing arc extinguishing.

The arc extinguishing unit 1300 further includes two yoke clamps 1320. The positions of two yoke clamps 1320 and two arc extinguishing magnets 1310 correspond, and two yoke clamps 1320 surrounds the sealing unit 1400 and two arc extinguishing magnets 1310. Through the design that yoke clamps 1320 surrounds the extinguishing magnet 1310, the magnetic field generated by the arc extinguishing magnet 1310 can be prevented from spreading outward, which will affect the arc extinguishing effect. The yoke clamps 1320 may be made of soft magnetic material. Soft magnetic materials can include but are not limited to iron, cobalt, nickel and their alloys.

As shown in FIGS. 1 to 4, 15 and 16, FIG. 1 is a schematic perspective view of the relay according to the first embodiment of the present disclosure, in which the coil and the magnetic circuit structure are omitted. FIG. 2 shows a schematic plan view of FIG. 1. FIG. 3 shows a cross-sectional view of A-A in FIG. 2. FIG. 4 is an exploded schematic view of FIG. 1. FIG. 15 is a perspective view of FIG. 1, in which the insulating cover is omitted. FIG. 16 is a cross-sectional view taken along line C-C in FIG. 2.

The sealing unit 1400 of the embodiment of the present disclosure includes a contact container 10, a pair of the static contact leading-out terminals 20, a connector 30, a first magnetizer 40 and a pushing rod assembly 50. The contact container 10 has a contact chamber 101, a pair of the first through holes 102 and a second through hole 103. Both the first through holes 102 and the second through hole 103 are communicated with the contact chamber 101. The pair of the static contact leading-out terminals 20 connects to the contact container 10, and pass through the pair of the first through holes 102 in one-to-one correspondence. The connector 30 passes through the second through hole 103, and includes a first end 31 and a second end 32, and the first end 31 is connected to the wall of the contact container 10. The first magnetizer 40 is disposed inside the contact chamber 101, and connected to the second end 32 of the connector 30. The pushing rod assembly 50 includes a movable contact piece 54 and a second magnetizer 55 fixedly connected to the movable contact piece 54. The movable contact piece 54 is disposed in the contact chamber 101, to make the movable contact piece 54 come into contact with or separate from the pair of the static contact leading-out terminals 20. The first magnetizer 40 is disposed at a side of the movable contact piece 54 facing the static contact leading-out terminals 20. The second magnetizer 55 is provided in the contact chamber 101 and located at the side of the movable contact piece 54 facing away from the first magnetizer 40. The second magnetizer 55 is used to form magnetic loop with the first magnetizer 40.

It can be understood that, in the relay of the present disclosure, the movable contact piece 54 is arranged between the first magnetizer 40 and the second magnetizer 55, when two ends of the movable contact piece 54 contact the pair of the static contact leading-out terminals 20, the second magnetizer 55 moving with the movable contact piece 54 closes or contacts with the first magnetizer 40, thus forming a magnetic loop around the movable contact piece 54 and between the first magnetizer 40 and the second magnetizer 55. When the current flows through the movable contact piece 54, an electromagnetic attraction force along the contact pressure direction will be generated between the first magnetizer 40 and the second magnetizer 55. The electromagnetic attraction can resist the electro-dynamic repulsion force generated due to short-circuit current between the movable contact piece 54 and the static contact leading-out terminals 20, and ensure that the movable contact piece 54 and the static contact leading-out terminals 20 do not bounce off.

As shown in FIG. 16, when both ends of the movable contact piece 54 are disconnected from the pair of the static contact leading-out terminals 20, because no current flows in the movable contact piece 54, so there is no electromagnetic attraction between the first magnetizer 40 and the second magnetizer 55.

The relay of the embodiment of the present disclosure, the first magnetizer 40 is connected to the contact container 10 by means of the connector 30. On the one hand, the first magnetizer 40 is connected to the contact container 10, instead of following the pushing rod assembly 50, and the electromagnetic attraction of the second magnetizer 55 to the first magnetizer 40 acts on the contact container 10 through the connector 30. Because the position of the contact container 10 is relatively fixed, it can avoid the movable contact piece 54 and the static contact leading-out terminals 20 from bouncing off due to the insufficient holding force of the pushing rod assembly 50, and avoid the relay from burning and exploding. On the other hand, the contact container 10 is provided with a second through hole 103, and the connector 30 passes through the second through hole 103, so that the connector 30 is connected with the contact container 10, and the first magnetizer 40 is connected with the connector 30. The first magnetizer 40 is connected to the contact container 10 through the connector 30 instead of directly connecting to the contact container 10, so that the connection process is unobstructed and visual, which is convenient for operation and ensures the reliability of the connection.

It can be understood that the terms “include” and “has” in the embodiments of this disclosure and any variations thereof are intended to cover non-exclusive inclusion. For example, a process, method, system, product or equipment that contains a series of steps or units is not limited to the listed steps or units, but optionally includes steps or units not listed in the lists, or optionally includes other steps or components inherent to these processes, methods, products or equipment.

The contact container 10 includes a yoke plate 13 and an insulating cover 11*a*. The insulating cover 11*a* covers one side of the yoke plate 13 to form the contact chamber 101 of the contact container 10. In one embodiment, the insulating cover 11*a* includes a top wall and a side wall. The first through holes 102 and the second through hole 103 are both opened in the top wall. The yoke plate 13 has a third through hole 131 communicated with the contact chamber 101. The pushing rod assembly 50 movable passes through the third through hole 131. Two yoke clamps 1320 surround the insulating cover 11*a*.

The insulating cover 11*a* includes a ceramic cover 11 and a frame piece 12. The ceramic cover 11 connects with the yoke plate 13 through the frame piece 12. The frame piece 12 can be a metal piece with an annular structure, such as iron-nickel alloy, and one end of the frame piece 12 is connected to the opening edge of the ceramic cover 11, for example, by laser welding, brazing, resistance welding, gluing, etc. The other end of the frame piece 12 is connected to the yoke plate 13 by laser welding, brazing, resistance welding, gluing, etc. Providing the frame piece 12 between the ceramic cover 11 and the yoke plate 13 can facilitate the connection between the ceramic cover 11 and the yoke plate 13.

Two arc extinguishing magnets 1310 are located on both sides of the ceramic cover 11, and two yoke clamps 1320 surround the ceramic cover 11 and two arc extinguishing magnets 1310.

The ceramic cover 11 includes a top wall 111 and a side wall 112. One end of the side wall 112 is connected around the periphery of the top wall 111. The other end of the side wall 112 is connected to the yoke plate 13 through the frame piece 12. The first through holes 102 and the second through hole 103 are both defined in the top wall 111. The first end 31 of the connector 30 connects to the outer surface of the top wall 111.

It can be understood that one of the pair of the static contact leading-out terminals serves as a terminal for the current to flow in and the other as a terminal for the current to flow out. The static contact leading-out terminals 20 pass through the first through holes 102, a part of the static contact leading-out terminals 20 extend into the contact chamber 101 for contact with or separation from the movable contact piece 54, and a part of the static contact leading-out terminals 20 are exposed on the outer surface of the ceramic cover 11.

The bottom of the static contact leading-out terminals 20 serve as static contacts, and both ends of the movable contact piece 54 along its length direction D2 can serve as movable contacts. The movable contacts at both ends of the movable contact piece 54 can protrude from other parts of the movable contact piece 54 or be flush with other parts.

It can be understood that the static contact can be integrally or separately arranged at the bottom of the static contact leading-out terminals 20, and the movable contacts can be integrally or separately arranged at both ends of the movable contact piece 54 along its length direction D2.

The second through hole 103 may arranged between two first through holes 102, That is, the connector 30 is located between the pair of the static contact leading-out terminals 20. The number of the second through holes 103 may be one or more. In this embodiment, the number of the second through hole 103 is two, but it is not limited to this.

Accordingly, the number of the connector 30 can be one or more. In this embodiment, the number of the connector 30 is two, but it is not limited to this.

Please continue to refer to FIG. 4. In the outer surface of the top wall 111 of the ceramic cover 11, the first metallization layer 113 is formed around the periphery of the first through holes 102, and the second metallization layer 114 is formed around the periphery of the second through hole 103. The static contact leading-out terminals 20 are welded with the top wall 111 through the first metallization layer 113. The first ends 31 of the connectors 30 is welded with the top wall 111 through the second metallization layer 114.

Compared with the inner surface of the ceramic cover 11, the outer surface of the top wall 111 of the ceramic cover 11 is easier to form a welding plane. Furthermore, since the top wall 111 of the ceramic cover 11 needs to provide the static contact leading-out terminals 20, when the static contact leading-out terminals 20 and the top wall 111 are welded, it is also necessary to provide a metallization layer around the first through holes 102. Therefore, when processing the first metallization layer 113 of the first through holes 102, the second metallization layer 114 of the second through hole 103 can be processed together. Therefore, by welding the connectors 30 on the outer surface of the top wall 111 of the ceramic cover 11, the metallization layer can be processed only on the outer surface of the top wall 111 without processing the metallization layer on the inner surface of the top wall 111, which is convenient for processing and simplifies the processing steps.

The first magnetizer 40 is spaced from the inner surface of the top wall 111. That is, the length of the connectors 30 is greater than the sum of the thickness of the top wall 111 and the thickness of the first magnetizer 40, so that the first magnetizer 40 is hung at the top wall 111 of the ceramic cover 11 through the connectors 30.

The first magnetizer 40 is spaced from the inner surface of the top wall 111, thus there is a gap between the first magnetizer 40 and the inner surface of the top wall 111. Since the first magnetizer 40 is not in direct contact with the inner surface of the top wall 111, the first magnetizer 40 does not affect the creepage distance of the pair of the static contact leading-out terminals 20.

Please continue to refer to FIG. 3 and FIG. 4. The first magnetizer 40 includes a plurality of magnetic conductive sheets 41 superimposed with each other. The magnetic conductive sheets 41 are connected with the second ends 32 of the connectors 30. Each magnetic conductive sheet 41 is provided with an opening 411. The connectors 30 pass through the opening 411 and are riveted with the lowest magnetic conductive sheets 41.

Of course, when the first magnetizer 40 includes a plurality of magnetic conductive sheets 41 superposed, the opening 411 of the magnetic conductive sheets 41 located at the bottom can also be a blind hole. While the openings 411 of the remaining magnetic conductive sheets 41 are through holes. The connectors 30 pass through the openings 411 of the remaining magnetic conductive sheets 41, extend into the blind holes of the magnetic conductive sheets 41 located at the bottom, and are welded with the magnetic conductive sheets 41.

In addition, in case that there is only one piece of first magnet 40, the first magnet 40 is provided with an opening 411, which can be a through hole or a blind hole. When the opening 411 is a through hole, the connectors 30 are riveted with the first magnetizer 40 after passing through the opening 411. When the opening 411 is a blind hole, solder can be placed in the blind hole. The second end 32 of the connectors 30 extends into the blind hole and is welded with the first magnetizer 40.

As an example, when the short-circuit current reaches above 10 kA, it is necessary to increase the thickness of the first magnetizer 40 to generate greater electromagnetic attraction, thereby ensuring that the electromagnetic attraction between the first magnetizer 40 and the second magnetizer 55 can overcome the repulsive force generated by short-circuit current and prevent the movable contact piece 54 and the static contact leading-out terminals 20 from bouncing off. However, the first magnetizer 40 with large thickness has a high cost, and it is difficult to connect with the ceramic cover 11.

In this embodiment, because the first magnetizer 40 is connected with the contact container 10 through the connectors 30, the first magnetizer 40 may include multiple pieces of magnetic conductive sheets 41 which are stacked with each other. The connectors 30 connect the contact container 10 through the openings 411 of multiple pieces of magnetic conductive sheets 41. The overall thickness of the first magnetizer 40 can be increased by increasing the number of magnetic conductive sheets 41 with thinner thickness. On the one hand, the thickness of magnetic conductive sheets 41 is relatively thin, and it can be made of thin strip, so the material cost is low and it is easy to operate. On the other hand, the number of magnetic conductive sheets 41 can be flexibly adjusted according to the short-circuit current.

The top wall 111 and the side wall 112 of the ceramic cover 11 can be separated and connected by welding. It can be understood that, by designing the ceramic cover 11 as a separated structure of the top wall 111 and the side wall 112, it is more convenient to connect the connectors 30 with the top wall 111. Of course, the top wall 111 and the side wall 112 can also be connected by bonding.

Specifically, because the top wall 111 is sheet-shaped, the sheet-shaped structure is easier to form the first through holes 102, the second through hole 103, the first metallization layer 113 and the second metallization layer 114 on the top wall 111. Further, the sheet structure is easier to weld the connectors 30, and the top wall 111, as well as the static contact leading-out terminals 20 and the top wall 111.

Of course, the top wall 111 and the side wall 112 of the ceramic cover 11 can also be integrated.

There are many ways to connect the second end 32 of the connectors 30 with the first magnetizer 40, such as welding, riveting and gluing.

In this embodiment, the second end 32 of the connectors 30 is riveted with the first magnetizer 40. Specifically, the second end 32 of the connectors 30 and the first magnetizer 40 are connected by expanded riveting.

It can be understood that the first magnetizer 40 can be straight line shape and the second magnetizer 55 can be U-shaped. The first magnetizer 40 and the second magnetizer 55 can be made of iron, cobalt, nickel and their alloys.

Of course, it can be understood that the second magnetizer 55 can also include a plurality of superposed magnetic conductive sheets, or the second magnetizer 55 includes a plurality of U-shaped magnetizers arranged side by side.

As shown in FIG. 14 and FIG. 16, the sealing unit 1400 also includes a metal cover 1410, which is connected to the side of the yoke plate 13 facing away from the insulating cover 11*a*. The metal cover 1410 covers the third through hole 131 on the yoke plate 13. The metal cover 1410 and the yoke plate 13 enclose a chamber for accommodating the stationary iron core 1230 and the moving iron core 1240 of the electromagnet unit 1200, which will be described in detail below.

As shown in FIG. 4 and FIG. 16, the pushing rod assembly 50 also includes a rod 51, a base 52 and an elastic piece 56. The rod 51 movably passes through the third through hole 131 of the yoke plate 13. One end of the rod 51 is connected with the base 52, and the other end of the rod 51 is connected with the moving iron core 1240 of the electromagnet unit 1200. The elastic piece 56 abuts against the base 52 at one end and abuts against the movable component 53 consisting of the movable contact piece 54 and the second magnetizer 55 at the other end. The elastic piece 56 provides elastic force, so that the movable contact piece 54 tends to move towards the static contact leading-out terminals 20.

It can be understood that the elastic piece 56 can be a spring, but it is not limited to this.

Of course, in other embodiments, the pushing rod assembly 50 can also have other structures, which are not listed here.

As shown in FIG. 16, the electromagnet unit 1200 includes a bobbin 1210, a coil 1220, a stationary iron core 1230, a movable iron core 1240 and a reset piece 1250. The bobbin 1210 has a hollow cylinder shape and is made of insulating material. The metal cover 1410 is installed in the bobbin 1210. The coil 1220 surrounds the bobbin 1210. The stationary iron core 1230 is fixedly arranged in the metal cover 1410, and part of the stationary iron core 1230 extends into the third through hole 131. The stationary iron core 1230 has a through hole 1231, which corresponds to the third through hole 131, for the rod 51 to pass through. The movable iron core 1240 is movably arranged in the metal cover 1410 and is opposite to the stationary iron core 1230. The moving iron core 1240 is connected with the rod 51 and used to be attracted by the stationary iron core 1230 when the coil 1220 is powered on. The movable iron core 1240 and the rod 51 can be connected by screwing, riveting, welding or other means.

The reset piece 1250 is located inside the metal cover 1410 and between the stationary iron core 1230 and the movable iron core 1240, and is used to reset the movable iron core 1240 when the coil 1220 is powered off. The reset piece 1250 can be a spring and is sleeved outside the rod 51.

As shown in FIGS. 5 to 8, FIG. 5 is a schematic side view of the pushing rod assembly according to the first embodiment of the present disclosure. FIG. 6 is an exploded schematic view of FIG. 5. FIG. 7 shows a partial enlarged view of X in FIG. 5. FIG. 8 is a cross-sectional view taken along line B-B in FIG. 5.

The pushing rod assembly 50 also includes a limit structure 57. The limit structure 57 is connected to the base 52 and the movable component 53 to limit the moving range of the movable component 53 relative to the base 52. The limit structure 57 includes a limit hole 572 and a limit member 571 cooperated with each other. The limit hole 572 includes a first end 573 and a second end 574 disposed oppositely in the movement direction D1 of the movable contact piece 54. The aperture of the second end 574 is large than the aperture of the first end 573. The limit member 571 passes through the limit hole 572 and can move between the first end 573 and the second end 574. The limit member 571 is located at the first end 573 of the limit hole 572 when the movable contact piece 54 is separated from the static contact leading-out terminals 20.

In this embodiment, the base 52 is directly in connection with the movable component 53 by the limit structure 57, which makes the assembling between the base and the movable component 53 easier. Moreover, since there are no components above the movable component 53, the motion interference between these components and the first magnetizer 40 is avoided during the overtravel process.

It can be understood that the limit hole 572 may be a through hole or a blind hole.

When the movable contact piece 54 is not in contact with the static contact leading-out terminals 20, under the action of the elastic piece 56, the limit member 571 is located at the first end 573 of the limit hole 572. When the movable contact piece 54 is in contact with the static contact leading-out terminals 20 and during the process of completing the overtravel, the limit member 571 moves from the first end 573 of the limit hole 572 to the second end 574. Since the aperture of the second end 574 of the limit hole 572 is greater than the aperture of the first end 573, the limit hole 572 presents a structure of "one end is big, and the other end is small". In the process of overtravel, the gap between the hole wall of the limit member 571 and the limit hole 572 becomes larger, which can prevent the hole wall of the limit member 571 and the limit hole 572 from rubbing and jamming during the movement of the movable contact piece 54 relative to the base 52. At the same time, the aperture of the first end 573 of the limit hole 572 is small, which does not affect the limit fit between the limit member 571 and the limit hole 572 in the initial state, and prevents the movable contact piece 54 from shaking relative to the base 52.

It should be noted that in order to realize the limit of the movable contact piece 54 and the base 52 in the initial state, the aperture of the first end 573 of the limit hole 572 should be adapted to the shape of the limit member 571. So that when the limit member 571 is located at the first end 573 of the limit hole 572, the limit member 571 can be limited with the hole wall of the limit hole 572.

Please continue to refer to FIGS. 5 to 8, the aperture of the limit hole 572 gradually increases along the direction from the first end 573 to the second end 574 of the limit hole 572. During the overtravel process, when the limit member 571 moves from the first end 573 to the second end 574 of the limit hole 572, the gap between the limit member 571 and the hole wall of the limit hole 572 gradually increases.

Further, the hole wall of the limit hole 572 includes a first plane 575 and a second plane 576 arranged oppositely and a first slope 577 and a second slope 578 arranged oppositely. One ends of the first slope 577 and the second slope 578 connect to two ends of the first plane 575, and the other ends of the first slope 577 and the second slope 578 connect to two ends of the second plane 576.

In this embodiment, the limit hole 572 is roughly an isosceles trapezoid, but it is not limited to this. For example, the shape of the limit hole 572 can also be a common trapezoid, that is, the slopes of the first slope 577 and the second slope 578 are not equal. Or the limit hole 572 can be a triangle, and preferably, the triangle can be an isosceles triangle.

Of course, in other embodiments, along the direction from the first end 573 to the second end 574 of the limit hole 572, the aperture of the limit hole 572 may not be gradually increased. For example, the hole wall of the limit hole 572 may also include equal-diameter segments and enlarged-diameter segments. For example, from the first end 573 to the second end 574, the hole wall of the limit hole 572 can include an enlarged-diameter segment, an equal diameter section, an enlarged-diameter segment, an equal diameter section and so on.

As shown in FIG. 7, the limit member 571 has first arc surfaces 571*a*. The first arc surfaces 571*a* are used to cooperate with the limit hole 572 to realize limitation along a length direction D2 of the movable contact piece 54 when the limit member is located at the first end 573 of the limit hole 572.

In this embodiment, the outer side walls of the limit member 571 are designed to include the first arc surfaces 571*a*. The first arc surfaces 571*a* is in line contact with the hole wall of the limit hole 572, and the line contact can reduce the friction between the limit member 571 and the hole wall of the limit hole 572. When the limit member 571 and the limit hole 572 move relatively, jamming is less likely to occur.

The limit hole 572 is defined in the base 52. The limit member 571 is disposed on the movable component 53. Of course, in other embodiments, the limit hole 572 can also be disposed on the movable component 53, and the limit member 571 is disposed on the base 52.

As shown in FIGS. 5 to 8, in this embodiment, the limit hole 572 is defined in the base 52. The limit member 571 is disposed on the second magnetizer 55. The second magnetizer 55 includes a bottom portion 551, a first side portion 552 and a second side portion 553. The first side portion 552 and the second side portion 553 are connected to both ends of the bottom port 551 along the width direction D3 of the movable contact piece 54. The first side portion 552 and the second side portion 553 are respectively set on the two opposite sides of the width direction D3 of the movable contact piece 54. The first side portion 552 and the second side portion 553 both have the limit member 571.

It can be understood that the direction of motion D1, length D2, and width D3 are perpendicular to each other.

The base 52 includes a base part 521, a first limit piece 522, and a second limit piece 523. Both the first limit piece 522 and the second limit piece 523 are connected to the base part 521 and opposite to each other. The first side portion 552 corresponds to the first limit piece 522, the second side portion 553 corresponds to the second limit piece 523, and both the first limit piece 522 and the second limit piece 523 have the limit hole 572.

Both the surface of the side of the first limit piece 522 towards the first side portion 552 and the surface of the side of the second limit piece 523 towards the second side portion 553 include the second arc surface 524.

In this embodiment, both the surface of the side of the first limit piece 522 towards the first side portion 552 and the surface of the side of the second limit piece 523 towards the second side portion 553 are designed to include the second arc surface 524, two second arc surfaces 524 are in line contact with the first side portion 552 and the second side portion 553, respectively. Line contact is beneficial for reducing the friction between the first side portion 552 and the first limit piece 522, as well as between the second side portion 553 and the second limit piece 523. When the second magnetizer 55 moves relative to the base 52, it is less prone to jamming, thus avoiding the generation of scratches and contaminating the contact chamber 101 of the relay.

Both the first side portion 552 and the second side portion 553 are located between the first limit piece 522 and the second limit piece 523. The side of the first side portion 552 facing away from the second side portion 553 and the side of the second side portion 553 facing away from the first side portion 552 are both provided with the limit members 571, which protrude outside.

As an example, the limit member 571 can be formed by stamping the side of the first side portion 552 or the second side portion 553, so that the limit member 571 can form a protrusion. The specific position of the protrusion on the first side portion 552 or the second side portion 553 can be flexibly adjusted according to the structure.

In this embodiment, because two limit members 571 are respectively arranged on the side of the first side portion 552 away from the second side portion 553, and the side of the second side portion 553 facing away from the first side portion 552. Therefore, the first side portion 552 and the second side portion 553 can fully contact with the first limit piece 522 and the second limit piece 523 respectively, thus ensuring the stability when the second magnetizer 55 and the base 52 are limited, without affecting the magnetic conductivity.

In an embodiment the limit member 571 may be a long strip. When the limit member 571 is located at the first end 573 of the limit hole 572, the side with a larger area contacts the hole wall of the limit hole 572. By contacting the side with a large area of the limit member 571 with the hole wall of the limit hole 572, the movable contact piece 54 is effectively prevented from swinging relative to the base 52 in the initial state, and the probability of rebound of the movable contact piece 54 is reduced.

As shown in FIG. 9, FIG. 9 is an exploded schematic view of the pushing rod assembly 50 according to the second embodiment of the present disclosure. The similarities between the second embodiment and the above-mentioned first embodiment are not repeated here, and the differences are as follows: the limit member 571 includes two protrusions. Two protrusions are arranged spaced with each other along the length direction D2 of the movable contact piece 54. The design of double protrusions effectively avoids the swing of the movable contact piece 54 relative to the base 52 in the initial state, and reduces the probability of the rebound of the movable contact piece 54.

As shown in FIG. 10, FIG. 10 is an exploded schematic view of the pushing rod assembly 50 according to the third embodiment of the present disclosure. The similarities between the third embodiment and the above-mentioned first embodiment are not repeated, and the differences are as follows: the limit member 571 is a rivet 579, and the rivet 579 is riveted to the first side portion 552 or the second side portion 553 of the second magnetizer 55.

As shown in FIG. 11, FIG. 11 is an exploded schematic view of the pushing rod assembly 50 according to the fourth embodiment of the present disclosure. The similarities between the fourth embodiment and the above-mentioned first embodiment are not repeated, and the difference is that the limit member 571 is arranged on the bottom portion 551 of the second magnetizer 55.

Specifically, the second magnetizer 55 includes a bottom portion 551, a first side portion 552 and a second side portion 553. Along the width direction D3 of the movable contact piece 54, the limit member 571 protrudes from the two opposite sides of the bottom portion 551. The first side portion 552 and the second side portion 553 are respectively connected to both ends of the bottom portion 551 along the width direction D3 of the movable contact piece 54. The first side portion 552 and the second side portion 553 are respectively arranged at two opposite sides of the movable contact piece 54 in the width direction D3.

The base 52 includes a base part 521, a first limit piece 522 and a second limit piece 523. The first limit piece 522 and the second limit piece 523 are both connected to the base part 521, and arranged oppositely. The first limit piece 522 and the second limit piece 523 are both provided with the limit holes 572.

As shown in FIG. 12, FIG. 12 is an exploded schematic view of the pushing rod assembly 50 according to the fifth embodiment of the present disclosure. The similarities between the fifth embodiment and the first embodiment are not repeated here, and the differences are as follows: the base 52 includes a base part 521, a first limit piece 522 and a second limit piece 523. The first limit piece 522 and the second limit piece 523 are both connected to the base part 521, and arranged oppositely. The first limit piece 522 and the second limit piece 523 are both provided with the limit holes 572. The movable component 53 further includes a fixing piece 58 fixedly connected to the second magnetizer 55. Two opposite sides of the fixing piece 58 are provided with the limit member 571.

As shown in FIG. 13, FIG. 13 is an exploded schematic view of the relay in the second embodiment of the present disclosure. The similarity between the relay of the second embodiment and the relay of the first embodiment will not be described in detail, but the differences are as follows: the limit members 571 protrudes from two opposite sides of the base 52 of the pushing rod assembly 50. The movable component 53 further includes a fixing piece 58 fixedly connected to the second magnetizer 55. The fixing piece 58 provided with the limit hole 572.

The fixing piece 58 is inverted U-shaped, and the positions of the first end 573 and the second end 574 of the limit hole 572 provided on the fixing piece 58 are just opposite to those of the limit hole 572 in the above embodiment.

Specifically, as shown in FIG. 13, the first end 573 of the limit hole 572 is located below and the second end 574 is located above. The aperture of the second end 574 is greater than that of the first end 573.

As shown in FIG. 9 to FIG. 12, the first end 573 of the limit hole 572 is located at the top and the second end 574 is located at the bottom.

It can be understood that, in the case of no contradiction, the various embodiments or implementations provided by this disclosure can be combined with each other. No examples will be given here.

In the embodiments of the present disclosure, the terms "first", "second" and "third" are only used for descriptive purposes and cannot be understood to indicate or imply relative importance; the terms such as "install", "connect with", "connect to" and "fix" should be interpreted broadly, for example, "connect to" may refer to fixedly connection, detachable connection or integral connection; "connect with" may refer to direct connection or indirect connected through an intermediate medium. For a person skilled in the art, the specific meanings of the above terms in the embodiments of the present disclosure may be understood according to specific situations.

In the description of the embodiment of the present disclosure, it should be understood that orientation or position relationship as indicated by the terms "upper", "lower", "left", "right", "front" and "rear" depend on the orientation or position relationship as shown in the drawings, only for the convenience of describing the embodiment of the present disclosure and simplifying the description, rather than for indicating or implying that the device or the unit must have a specific direction and can be constructed and operated in a specific orientation, and thus cannot be construed as limiting the embodiments of the present disclosure.

In this specification, the descriptions of the terms "one embodiment", "some embodiments" and "specific embodiments" mean that specific features, structures, materials or characteristics described in connection with the embodiment or example are included in at least one of the embodiments or examples of the present disclosure. In this specification, it is not necessary that the exemplary expressions of the above terms refer to the same embodiment or example. Moreover, the specific features, structures, materials or characteristics may be combined in any one or more embodiments or examples in a suitable manner.

The above embodiments are only the preferred embodiments of the present disclosure, but not limit to the present disclosure. For the person skilled in the art, the embodiments may be modified and varied. Any modifications, equivalent substitutions, improvements, etc. made within the spirit and principle of the embodiments of the present disclosure should be included in the protection scope of the embodiments of the present discourse.

What is claimed is:

1. A relay, comprising:

a contact container having a contact chamber, a pair of first through holes and a second through hole, both the first through holes and the second through hole being communicate with the contact chamber;

a pair of static contact leading-out terminals passing through the pair of the first through holes in one-to-one correspondence and being connected to the contact container;

a connector passing through the second through hole and comprising a first end and a second end, the first end being connected to the contact container;

a first magnetizer being provided in the contact chamber and connected to the second end of the connector; and a pushing rod assembly comprising a movable component with a movable contact piece, the movable component being movably provided in the contact chamber to make the movable contact piece come into contact with or separate from the pair of static contact leading-out terminals, the first magnetizer being arranged at a side of the movable contact piece facing the static contact leading-out terminals.

2. The relay according to claim 1, wherein the second through hole is located between the pair of first through holes.

3. The relay according to claim 1, wherein the contact container comprising:

a yoke plate having a third through hole communicating with the contact chamber, the pushing rod assembly movable passing through the third through hole; and an insulating cover connected to the yoke plate;

wherein both the first through holes and the second through hole are formed on the insulating cover, the first end of the connector is connected to an outer surface of the insulating cover.

4. The relay according to claim 3, wherein the insulating cover comprises a top wall and a side wall, one end of the side wall is connected to the top wall, and the other end of the side wall is connected to the yoke plate, both the first through holes and the second through hole are formed on the top wall.

5. The relay according to claim 4, wherein the top wall and the side wall are integrated or separated.

6. The relay according to claim 4, wherein the first magnetizer is spaced from an inner surface of the top wall.

7. The relay according to claim 3, wherein the insulating cover comprises a ceramic cover and a frame piece, the ceramic cover comprises a top wall and a side wall, the side wall is connected to the yoke plate through the frame piece;

the outer surface of the top wall at the periphery of the first through holes is provided with a first metallization layer, the outer surface of the top wall at the periphery of the second through hole is provided with a second metallization layer;

the static contact leading-out terminals are welded to the top wall through the first metallization layer, the first end of the connector is welded to the top wall through the second metallization layer.

8. The relay according to claim 7, wherein the top wall and the side wall are integrated or separated.

9. The relay according to claim 7, wherein the first magnetizer is spaced from an inner surface of the top wall.

10. The relay according to claim 1, wherein the second end of the connector and the first magnetizer are riveted or welded or glued together.

11. The relay according to claim 1, wherein the first magnetizer comprises a plurality of magnetic conductive sheets superposed with each other, the magnetic conductive sheets are connected with the second end of the connector.

12. The relay according to claim 1, wherein the pushing rod assembly further comprising:

a base;

an elastic piece, the elastic piece abuts on the base at one end and abuts on the movable component at the other end, the elastic piece provides elastic force to make the movable contact piece tend to move towards the static contact leading-out terminals;

a limit structure connected to the base and the movable component, the limit structure is configured to limit a movement range of the movable component relative to the base; the limit structure comprises a limit hole and a limit member that cooperate with each other, the limit hole comprises a first end and a second end along an opposite direction of the movement of the movable contact piece, the limit member passes through the limit hole and can move between the first end and the second end;

when the movable contact piece is separated from the static contact leading-out terminals, the limit member is located at the first end of the limit hole.

13. The relay according to claim 12, wherein an aperture of the second end is greater than an aperture of the first end.

14. The relay according to claim 12, wherein the limit member has first arc surfaces, the first arc surfaces are configured to cooperate with the limit hole to realize limitation along a length direction of the movable contact piece when the limit member is located at the first end of the limit hole.

15. The relay according to claim 12, wherein the movable component further comprises a fixing piece fixedly connected to the movable contact piece, the limit member is provided on one of the fixing piece and the base, and the limit hole is formed in the other one of the fixing piece and the base.

* * * * *